United States Patent
Palmese et al.

(10) Patent No.: US 10,253,135 B2
(45) Date of Patent: Apr. 9, 2019

(54) TOUGHENING OF ANHYDRIDE CURED THERMOSETTING EPOXY POLYMERS USING GRAFTED TRIGLYCERIDES

(71) Applicant: Drexel University, Philadelphia, PA (US)

(72) Inventors: Giuseppe R. Palmese, Hainesport, NJ (US); Santosh Kumar Yadav, Philadelphia, PA (US); Fengshuo Hu, Mason, OH (US)

(73) Assignee: DREXEL UNIVERSITY, Philadelphia, PA (US)

( * ) Notice: Subject to any disclaimer, the term of this patent is extended or adjusted under 35 U.S.C. 154(b) by 0 days.

(21) Appl. No.: 14/849,892

(22) Filed: Sep. 10, 2015

(65) Prior Publication Data
US 2016/0075872 A1    Mar. 17, 2016

Related U.S. Application Data

(60) Provisional application No. 62/049,884, filed on Sep. 12, 2014.

(51) Int. Cl.
| | | |
|---|---|---|
| *C08G 59/42* | (2006.01) | |
| *C08G 59/02* | (2006.01) | |
| *C08G 59/16* | (2006.01) | |

(52) U.S. Cl.
CPC ....... *C08G 59/027* (2013.01); *C08G 59/1455* (2013.01); *C08G 59/42* (2013.01)

(58) Field of Classification Search
CPC ... C08G 59/027; C08G 59/1455; C08G 59/42
See application file for complete search history.

(56) References Cited

U.S. PATENT DOCUMENTS

| | | |
|---|---|---|
| 2,628,514 A | 2/1953 | Frist |
| 2,682,515 A | 6/1954 | Naps |
| 4,040,994 A | 8/1977 | Lewis et al. |
| 5,973,082 A | 10/1999 | Elmore |
| 6,121,398 A | 9/2000 | Wool et al. |
| 6,194,490 B1 | 2/2001 | Roth et al. |
| 6,583,302 B1 | 6/2003 | Erhan et al. |
| 6,825,242 B2 | 11/2004 | Sulzbach et al. |
| 8,785,547 B2 | 7/2014 | Palmese et al. |
| 2003/0139489 A1 | 7/2003 | Sulzbach et al. |
| 2009/0275715 A1 | 11/2009 | Boyles et al. |
| 2010/0144965 A1 | 6/2010 | Marks et al. |

FOREIGN PATENT DOCUMENTS

| | | |
|---|---|---|
| EP | 1884531 A1 | 2/2008 |
| WO | WO9422954 A1 | 10/1994 |
| WO | WO2014075182 A1 | 5/2014 |
| WO | WO2014130391 A1 | 8/2014 |

OTHER PUBLICATIONS

International Search Report and Written Opinion; dated Dec. 21, 2015 for PCT Application No. PCT/US2015/049314.
Wang, R., et al. "Vegetable oil-derived epoxy monomers and polymer blends: a comparative study with review." eXPRESS Polymer Letters 7.3 (2013): 272-292.
Sabzevari, S. M., et al. "Effect of thermoplastic toughening agent on glass transition temperature and cure kinetics of an epoxy prepreg." Journal of thermal analysis and calorimetry 106.3 (2011): 905-911.
Miyagawa, Hiroaki, et al. "Fracture toughness and impact strength of anhydride-cured biobased epoxy." Polymer engineering and science 45.4 (2005): 487.
Altuna, F. I., et al. "Thermal and mechanical properties of anhydride-cured epoxy resins with different contents of biobased epoxidized soybean oil." Journal of Applied Polymer Science 120.2 (2011): 789-798.
Ratna, D., & Banthia, A. K. (2000). Epoxidized soybean oil toughened epoxy adhesive. Journal of Adhesion Science and Technology, 14(1), 15-25.
Park, S. J., Jin, F. L., & Lee, J. R. (2004). Thermal and mechanical properties of tetrafunctional epoxy resin toughened with epoxidized soybean oil. Materials Science and Engineering: A, 374(1), 109-114.
European Search Report; dated Mar. 13, 2018 for EP Application No. EP15839729.9.
Australian Examination Report; dated Aug. 20, 2018 for AU Application No. 2015315051.

*Primary Examiner* — Kara B Boyle
(74) *Attorney, Agent, or Firm* — Mendelsohn Dunleavy, P.C.

(57) ABSTRACT

Grafted triglycerides prepared from an epoxidized triglyceride and an acid anhydride containing 4 to 40 carbon atoms are reacted with an epoxy resin and an anhydride curing agent to yield an epoxy thermoset. By varying the length of fatty residues on the grafted triglyceride, the number of fatty residues per triglyceride, the identity of the epoxy resin and the anhydride curing agent, it is possible to prepare epoxy thermosets that exhibit superior physical properties compared to the properties of epoxy thermosets prepared without the grafted triglyceride, or as compared to epoxy thermosets wherein the epoxidized triglyceride is used in place of the grafted triglyceride. A significant improvement in fracture toughness with a minimal reduction of glass transition temperature may be thus achieved.

21 Claims, 20 Drawing Sheets

TOUGHENING OF ANHYDRIDE CURED THERMOSETTING EPOXY POLYMERS USING GRAFTED TRIGLYCERIDES

RELATED APPLICATION DATA

This application claims the benefit of U.S. Provisional Application No. 62/049,884, filed on Sep. 12, 2014, the contents of which are hereby incorporated by reference herein.

FIELD OF THE INVENTION

The present invention is directed to epoxy thermoset polymer toughening agents and to anhydride-cured epoxy resins made using these toughening agents.

DESCRIPTION OF RELATED TECHNOLOGY

Epoxy resins are used in thermoset polymer matrix composite fabrication for construction, industrial, military and commercial applications due to their desirable properties, low weight and low cost. The basic epoxy resin composition is the diglycidyl ether of a dihydric phenol, the most important of which from a commercial viewpoint is the diglycidyl ether of p,p'-dihydroxydiphenyl propane (Bisphenol A). Such diglycidyl ethers can be converted into thermoset compositions by a wide variety of curing agents, or can be converted into higher molecular weight epoxy resins by reaction with additional polyhydric phenol.

However, epoxy thermosets are intrinsically brittle and display a poor resistance to crack propagation due to the high degree of chemical cross-linking in the resin network. Epoxy toughening has long been a challenging topic in both academia and industry. One of the major strategies for toughening epoxy resins involves incorporation of another thermoset component (such as liquid rubber or a thermoplastic) into the epoxy network. The phase-separated morphology can contribute to toughening of the epoxy thermoset via one or more of several mechanisms. A concern with toughening epoxy resins is the possible deterioration of one or more of mechanical strength, modulus, and/or thermal properties. The covalent incorporation of a stiff macromolecular structure into an epoxy network may ameliorate the toughness of the thermoset epoxy matrices through a reduction in the cross-linking density of the epoxy network, while substantially maintaining the desired glass transition temperature and mechanical strength of the polymer.

Recently, a considerable amount of research has been undertaken to toughen epoxy networks using various renewable bio-based advanced materials. The use of vegetable oils is of great interest, because vegetable oils are renewable and can significantly contribute to a more sustainable development. Epoxidized soybean oil (ESO) has attracted interest due to its moderate viscosity, good miscibility with epoxy resins, easy availability and relatively low cost.

Blends of polyglycidyl ethers of polyhydric phenols with epoxidized fatty acid esters, e.g., epoxidized linseed oil, are described in U.S. Pat. No. 2,628,514. Adhesive compositions made from blends of liquid polyglycidyl ethers of dihydric phenols, solid polyglycidyl ethers of dihydric phenols and epoxidized fatty acid esters are described in U.S. Pat. No. 2,682,515.

Triglycerides are found in oils, such as soybean oil, linseed oil, etc. Soybean oil, as an example, is a renewable resource which contains different kinds of unsaturated fatty acids and saturated fatty acids with varying carbon chain lengths. Three unsaturated fatty acids with varying functionalities are connected by a glycerol center. The major unsaturated fatty acids in soybean oil triglycerides are the poly-unsaturates, comprising about 7 to 10% tri-unsaturated $C_{18}$ alpha-linolenic acid, 51% di-unsaturated $C_{18}$ linoleic acid, and 23% mono-unsaturated $C_{18}$ oleic acid. On average, there are about 4.6 double bonds per triglyceride.

Epoxidized soybean oil (ESO) is a type of functionalized triglyceride. ESO has been used as a composite (W. Thielemans et al., *Journal of Applied Polymer Science*, 2002, vol. 83, pp 323-331 and J. Lu et al., *Polymer*, 2005, 46:71-80), a lubricant, a plasticizer, and a thermal stabilizer (P. S. Lathi, *Applied Catalysis B: Environmental*, 2007, vol. 69, pp 207-212, P. G. Demertzis et al., *European Polymer Journal*, 1991, vol. 27, iss. 3, pp 231-235 and P. Liu et al., *Polymer Degradation and Stability*, 2007, vol. 92, pp 503-508). Using ESO to toughen epoxy resins is also known. See for example S. J. Park et al., *Materials Science and Engineering A*, 2004, vol. 374, pp 109-114, D. Ratna *Journal of Adhesion Science and Technology*, 2000, vol. 14, iss. 1, pp 15-25 and H. Miyagawa et al., *Polymer Engineering and Science*, 2005, vol. 45, iss. 4, pp 487-495.

U.S. Pat. No. 6,121,398 discloses high modulus polymers and composites that are derived from plant oils. This patent includes an extensive discussion of the various types and uses of triglycerides obtained from natural sources such as plant oils. This patent also discloses functionalized triglycerides that are polymerizable and their use to produce high modulus polymers. The functionalized triglycerides may be produced via a number of different chemical synthesis routes. For example, epoxidized triglycerides may be produced and converted to resilient rubbers by control of their molecular weight and cross-link density. The resultant rubbers can be used as rubber toughening agents in rigid composites. Other functionalized triglycerides are described in U.S. Pat. No. 6,825,242, US 2003/0139489 and US 2009/0275715.

U.S. Pat. No. 8,785,547 discloses grafted triglycerides comprising an acrylated triglyceride grafted with a fatty acid residue containing 4 to 28 carbon atoms, and methods for making a grafted triglyceride and methods for curing a material selected from vinyl esters and unsaturated polyesters and mixtures thereof using such grafted triglycerides. The method includes the steps of mixing a grafted triglyceride with a material selected from vinyl esters, unsaturated polyesters and mixtures thereof to form a mixture, and curing the mixture to form a cured resin system. The cured resin system comprising the cured product obtained by the foregoing method and composites containing the cured product and a filler or reinforcing material are also disclosed. The grafted triglycerides are used to make toughened resin and composite systems with reduced hazardous air pollutants without significantly reducing the glass transition temperature or significantly increasing the viscosity of the curable mixture.

U.S. Pat. No. 4,040,994 (Unitech, 1977) discloses anhydride curing of an epoxy system containing three or more epoxy compounds, at least two of which are epoxidized fatty acid esters. Exemplified are reactions of DGEBA, and one or more of epoxidized soybean or linseed oil, and epoxidized linseedate. Epoxidized linseedate is an epoxidized reaction product of butyl alcohol and linseed oil ester.

U.S. Pat. No. 6,194,490 discloses a reaction product of epoxylated natural oil, glycidyl ester, and anhydride. Table 1 shows Example 1, which comprises ESO, DGEBA, and MTHPA.

WO 1994/022954 discloses high solids coating compositions that are made from organic solvent solutions of: (A) a reaction product of: (1) an epoxidized vegetable oil, (2) a diglycidyl ether of a dihydric phenol, and (3) a dihydric phenol; (B) an unsaturated fatty acid; and (C) an alkylacetoacetate. The catalyst is a phosphonium salt.

D. Ratna and A. K. Banthia, "Epoxidized soybean oil toughened epoxy adhesive," *J. Adhesion Sci. Technol.* 14(1), 15-25 (2000) discloses a reaction product of ESO and DGEBA, cured with an amine hardener. The ESO component lacks —OC(O)C$_{5-15}$ groups derived from fatty acids.

R. Wang and T. P. Schuman, "Vegetable oil-derived epoxy monomers and polymer blends: A comparative study with review," *eXPRESS Polymer Letters*, 7(3), 272-292 (2013), discloses a reaction product of fatty acids derived from ESO with DGEBA.

Crosslink density has been recognized as an indicator of the rigidity of a polymer. Flexible polymers typically have low crosslink densities while high crosslink densities have been recognized as necessary for high modulus materials. Rigid aromatic cross-linking reagents such as bisphenol A have been used to create higher modulus polymers with triglycerides, sometimes using styrene to enhance rigidity (Drzal Macromol. *Mater. Engrg.* 289; 629-635, (2004), Larock *Biomolecules* 6, 797-806, (2005)).

U.S. Pat. No. 5,973,082 discloses a reaction of epoxidized vegetable oil, DGEBA, and a fatty acid. The reaction includes other components, and the epoxidized vegetable oil is reacted with DGEBA before being reacted with a fatty acid.

S. J. Park et al., "Thermal and mechanical properties of tetrafunctional epoxy resin toughened with epoxidized soybean oil," *Materials Science and Engineering* A 374, 109-114 (2004), discloses a reaction product of ESO and an epoxy resin, TGDDM.

F. I. Altuna et. al., "Thermal and Mechanical Properties of Anhydride-Cured Epoxy Resins with Different Contents of Biobased Epoxidized Soybean Oil," *J. Appl. Polym. Sci.*, 120, 789-798 (2011), have studied various blends of epoxidized soybean oil and DGEBA cured with anhydrides. It was observed that the best composition of DGEBA employed 40 wt % of epoxidized soybean oil, which resulted in a resin with an optimum set of properties; the impact strength increased about 38%, with the glass transition temperature being about 110° C., which might be caused by the reduction of crosslinking density of the epoxy network.

Miyagawa et al., "Fracture Toughness and Impact Strength of Anhydride-Cured Biobased Epoxy," *Polymer Engineering & Sci.* 45(4), 487-495 (2005), evaluated the fracture behavior of anhydride cured epoxy networks grafted with ESO and epoxidized linseed oil ("ELO"). They found that the fracture toughness does not significantly change with the addition of ELO, but it was significantly improved with an addition of 30 wt % ESO.

A need exists for a new type of epoxy thermoset that has improved physical properties, such as increased toughness without having a significant adverse effect on other key properties of materials such as glass transition temperature, viscosity and other properties.

SUMMARY OF THE INVENTION

In a first aspect, the present invention relates to an epoxy thermoset prepared by reaction of: (a) a grafted triglyceride prepared by a reaction of an epoxidized triglyceride with an acid anhydride, wherein the acid anhydride contains from about 4 to about 40 carbon atoms per molecule; (b) an epoxy resin; and (c) an anhydride curing agent, wherein the weight ratio of the grafted triglyceride to the epoxy resin is in the range of about 1:99 to about 99:1.

In a second aspect, the present invention relates to the above-described epoxy thermoset, wherein a molar ratio of the acid anhydride to the epoxidized triglyceride is from about 0.1:1 to about 4:1.

In a third aspect, the present invention relates to the above-described epoxy thermoset, wherein a molar ratio of the acid anhydride to the epoxidized triglyceride is from about 1:1 to about 3.5:1.

In a fourth aspect, the present invention relates to the above-described epoxy thermoset, wherein a molar ratio of the acid anhydride to the epoxidized triglyceride is from about 2:1 to about 3:1.

In a fifth aspect, the present invention relates to the above-described epoxy thermoset, wherein the grafted triglyceride has a molecular weight of from about 990 g/mole to about 3280 g/mole.

In a sixth aspect, the present invention relates to the above-described epoxy thermoset, wherein the weight ratio of the grafted triglyceride to the epoxy resin is in the range of about 1:99 to about 30:70.

In a seventh aspect, the present invention relates to the above-described epoxy thermoset, wherein the triglyceride is obtained from a material selected from a plant oil, an animal oil, an algae oil, and a mixture thereof.

In an eighth aspect, the present invention relates to the above-described epoxy thermoset, wherein the grafted triglyceride comprises one or more epoxy groups.

In a ninth aspect, the present invention relates to the above-described epoxy thermoset, wherein the epoxy resin is selected from bisphenol A epoxy resin, bisphenol F epoxy resin, novolac epoxy resin, aliphatic epoxy resin, and glycidylamine epoxy resin.

In a tenth aspect, the present invention relates to the above-described epoxy thermoset, wherein the epoxy resin is a bisphenol-A diglycidyl ether epoxy resin monomer or an oligomer thereof.

In an eleventh aspect, the present invention relates to the above-described epoxy thermoset, wherein the acid anhydride is selected from a compound of the formula $R_1$—C(O)—O—C(O)—$R_2$, wherein $R_1$ and $R_2$ is each independently selected from an alkyl group containing from about 1 to about 19 carbon atoms.

In a twelfth aspect, the present invention relates to the above-described epoxy thermoset, wherein the anhydride curing agent is selected from methylhexahydrophthalic anhydride, hexahydrophthalic anhydride, methyltetrahydrophthalic anhydride, phthalic anhydride, trimellitic anhydride, pyromellitic anhydride, benzophenone-3,3',4,4'-tetracarboxylic dianhydride, glycerol tris(trimellitate anhydride), maleic anhydride, tetrahydrophthalic anhydride, 3,6-Endomethylene-1,2,3,6-tetrahydrophthalic anhydride, methyl endomethylene tetrahydrophthalic anhydride, dodecenyl succinic anhydride, hexahydrophthalic anhydride, hexahydro-4-methylphthalic anhydride, succinic anhydride, methylcyclohexene dicarboxylic anhydride, chlorendic anhydride, and mixtures thereof.

In a thirteenth aspect, the present invention relates to the above-described epoxy thermoset, wherein the acid anhydride is selected from methylhexahydrophthalic anhydride, hexahydrophthalic anhydride, methyltetrahydrophthalic anhydride, phthalic anhydride, trimellitic anhydride, pyromellitic anhydride, benzophenone-3,3',4,4'-tetracarboxylic dianhydride, glycerol tris(trimellitate anhydride), maleic anhydride, tetrahydrophthalic anhydride, 3,6-endomethylene-1,2,3,6-tetrahydrophthalic anhydride, methyl endomethylene tetrahydrophthalic anhydride, dodecenyl succinic anhydride, hexahydrophthalic anhydride, hexahydro-4-methylphthalic anhydride, succinic anhydride, methylcyclohexene dicarboxylic anhydride, chlorendic anhydride, and mixtures thereof.

In a fourteenth aspect, the present invention relates to the above-described epoxy thermoset, wherein the acid anhydride contains 12 to 32 carbon atoms per molecule.

In a fifteenth aspect, the present invention relates to a composite comprising the above-described epoxy thermoset.

In a sixteenth aspect, the present invention relates to the above-described composite, comprising a filler and/or a reinforcing material.

In a seventeenth aspect, the present invention relates to the above-described composite, comprising one or more materials selected from fibers, clays, silicates, fillers and whiskers.

In an eighteenth aspect, the present invention relates to the above-described composite, comprising one or more additives selected from colorants, pigments, carbon black, impact modifiers, antioxidants, stabilizers, flame retardants, reheating aids, crystallization aids, oxygen scavengers, plasticizers, flexibilizers, nucleating agents, foaming agents, and mold release agents.

In a nineteenth aspect, the present invention relates to a grafted triglyceride prepared by a reaction of an epoxidized triglyceride with an acid anhydride, wherein the acid anhydride contains from about 4 to about 40 carbon atoms per molecule.

In a twentieth aspect, the present invention relates an epoxy thermoset prepared by a reaction of a grafted triglyceride prepared by a reaction of an epoxidized triglyceride with an acid anhydride, wherein the acid anhydride contains from about 4 to about 40 carbon atoms per molecule; and an anhydride curing agent.

The grafted triglyceride of the present invention is prepared by reacting an epoxidized triglyceride with an acid anhydride or a mixture of acid anhydrides. The grafted triglycerides of the present invention may include triglycerides that are modified to fine tune the molecular weight of the triglyceride, and/or to adjust the reactivity of the triglycerides with the epoxide resin.

Any reaction conditions may be used to generate the grafted triglyceride, as long as such conditions cause the epoxy groups on the epoxidized triglyceride react with the acid anhydride group. The grafted triglyceride may be prepared via a one-batch synthesis, wherein the epoxidized triglyceride is reacted with the acid anhydride. The molar ratio of the acid anhydride to the epoxidized triglyceride is from about 0.1:1 to about 4:1, or about 1:1 to about 3.5:1, or about 2:1 to about 3:1.

The grafted triglyceride blended with an epoxy resin is reacted with an anhydride curing agent to generate a toughened epoxide thermoset. Aside from the grafted triglyceride and the epoxy resin, the reaction used to form the epoxy thermoset also involves at least one anhydride curing agent.

The preparation of the epoxy thermoset according to the present invention involves a reaction of: (a) a grafted triglyceride prepared by a reaction of an epoxidized triglyceride with a acid anhydride, wherein the acid anhydride contains from about 4 to about 40 carbon atoms per molecule; (b) an epoxy resin; and (c) an anhydride curing agent, wherein the weight ratio of the grafted triglyceride to the epoxy resin is in the range of about 1:99 to about 30:70. Any reaction conditions may be used to generate the epoxy thermoset, as long as such conditions cause the epoxy groups on the epoxidized triglyceride to react with epoxy groups on the epoxy resin, and the anhydride curing agent.

DETAILED DESCRIPTION OF THE INVENTION

Figure 1:
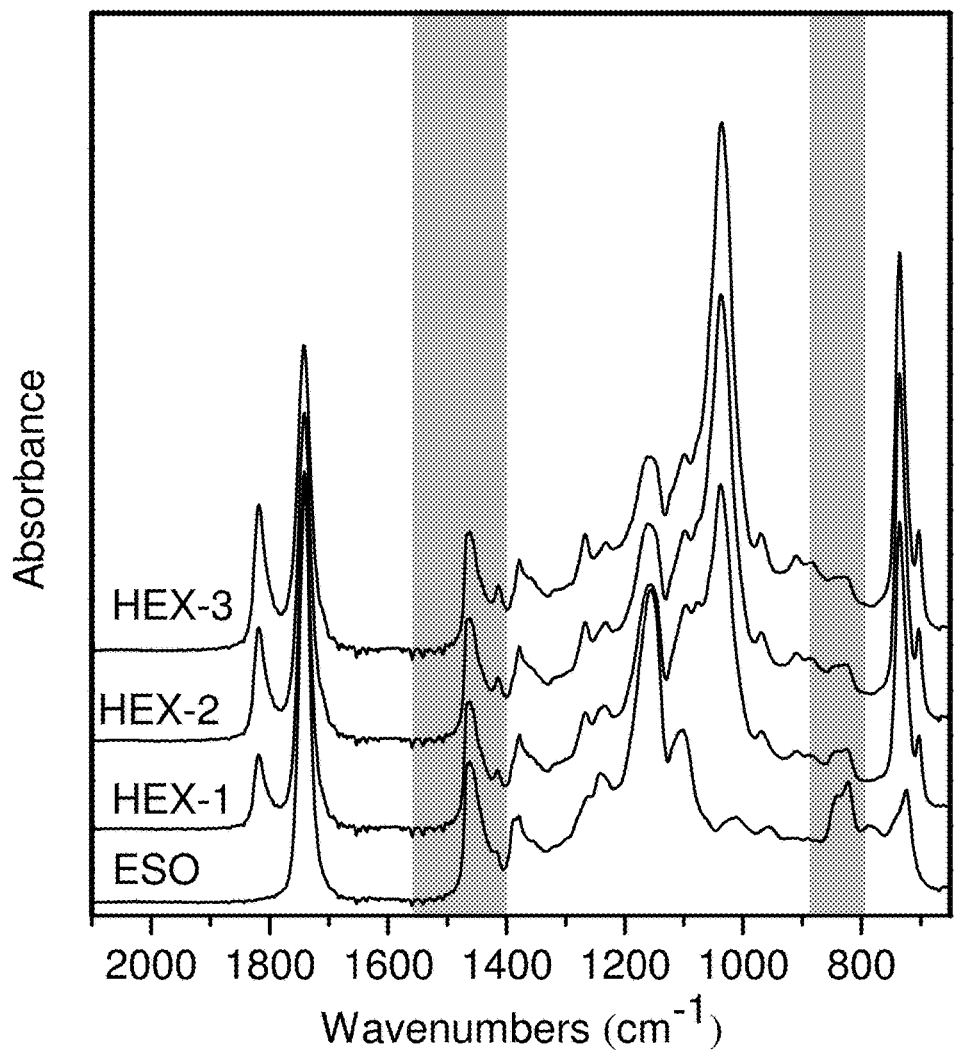
FIG. 1 shows an FTIR Spectra of epoxidized soybean oil and modified ESO.

For illustrative purposes, the principles of the present invention are described by referencing various exemplary embodiments thereof. Although certain embodiments of the invention are specifically described herein, one of ordinary skill in the art will readily recognize that the same principles are equally applicable to, and can be employed in other apparatuses and methods. Before explaining the disclosed embodiments of the present invention in detail, it is to be understood that the invention is not limited in its application to the details of any particular embodiment shown. The terminology used herein is for the purpose of description and not of limitation. Further, although certain methods are described with reference to certain steps that are presented herein in certain order, in many instances, these steps may be performed in any order as may be appreciated by one skilled in the art, and the methods are not limited to the particular arrangement of steps disclosed herein.

As used herein and in the appended claims, the singular forms "a", "an", and "the" include plural references unless the context clearly dictates otherwise. The terms "a" (or "an"), "one or more" and "at least one" can be used interchangeably herein. It is also to be noted that the terms "comprising", "including", and "having" can be used interchangeably.

The present invention relates to a thermoset polymer composition and to a process for preparing such a composition. The thermoset polymer composition contains a reaction product of one or more epoxy resins, one or more grafted triglycerides, and one or more anhydride curing agents. Such a thermoset polymer composition may exhibit properties that are superior to the properties of similar thermosets that do not include a grafted triglyceride in the reaction mixture, or that include a triglyceride in the reaction mixture that does not contain grafted groups.

In one aspect of the present invention, the epoxy thermoset is prepared by reaction of: (a) a grafted triglyceride, which is itself prepared by a reaction of an epoxidized triglyceride with an acid anhydride, wherein the acid anhydride contains from about 4 to about 40 carbon atoms per molecule; (b) an epoxy resin; and (c), an anhydride curing agent, wherein the weight ratio of the grafted triglyceride to the epoxy resin is in a range of about 1:99 to about 30:70.

[Grafted Triglyceride]

The grafted triglyceride of the present invention is prepared by reacting an epoxidized triglyceride with an acid anhydride or a mixture of acid anhydrides. The grafted triglycerides of the present invention may include triglycerides that are modified to fine tune the molecular weight of the triglyceride, and/or to adjust the reactivity of the triglycerides with the epoxide resin.

[Triglyceride]

Triglycerides are a combination of triesters of fatty acids linked together by a glycerol. The fatty acid residues are derived from linear carboxylic acids containing from about 4 to about 30 carbon atoms, or from about 5 to about 22 carbon atoms, or, from about 6 to about 16 carbon atoms. At least one of the fatty acid residues that are part of the triglyceride contains unsaturation in the form of at least one carbon-carbon double bond. Not every one of the fatty residues bound to the glycerol needs to have a carbon-carbon double bond. Each triglyceride must contain at least one carbon-carbon double bond and may contain up to about 12 carbon-carbon double bonds. Typically, fatty acid residues having carbon-carbon double bonds will contain from about 1 to 4 carbon-carbon double bonds per residue.

The triglycerides of the present invention may be derived from plant and animal oil sources, for example, lard, rapeseed oil, palm oil, beef tallow, fish oil, soy bean oil, canola oil, sunflower oil, safflower oil, rice bran, corn oil, peanut oil, cottonseed oil, castor oil, linseed oil and colza oil. These triglycerides include a number of reactive sites for functionalization such as the double bond in triglycerides containing unsaturated groups, allylic carbons, ester groups and the carbons in the alpha position relative to an ester group. The present invention introduces functionality to the triglycerides at one or more of these reactive sites in order to introduce polymerizable groups onto the triglycerides and modify the molecular weight of the triglycerides.

[Epoxidized Triglyceride]

Triglycerides may be converted to epoxidized triglycerides in any conventional manner such as by reaction with hydrogen peroxide. The resultant epoxy groups on the triglycerides can be employed as reactive sites for further modification of the epoxidized triglycerides. The number of double bonds in the triglycerides which are converted to epoxy groups may be controlled during the epoxidation reaction in a suitable, conventional manner, if it is desired to retain some of the double bonds in the triglyceride or to control the degree of epoxidation. The degree of epoxidation of the triglyceride may also be influenced by selection of the starting triglyceride based on the number of unsaturated groups contained therein.

An exemplary structure of an epoxidized triglyceride is:

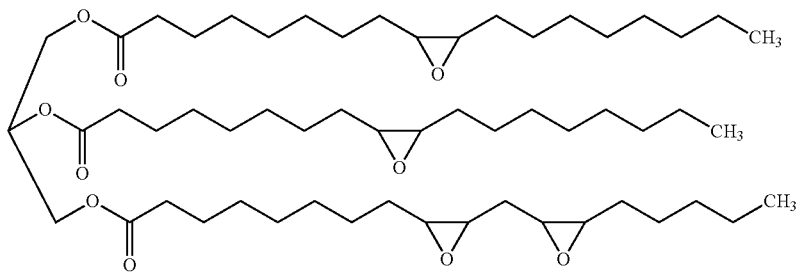 [SMILES: CCCCCCCCC1OC1CCCCCCCC(=O)OCC(COC(=O)CCCCCCCC1OC1CC1OC1CCCCC)OC(=O)CCCCCCCC1OC1CCCCCCCC]

[Acid Anhydride]

The epoxidized triglyceride is reacted with an acid anhydride or a mixture of acid anhydrides. The acid anhydrides of the present invention are hydrocarbons that contain at least one —C(O)—O—C(O)— group that bridge two hydrocarbyl groups. In some embodiments, the acid anhydride comprises more than one —C(O)—O—C(O)— group per molecule.

As used herein, the term "hydrocarbyl substituent" or "hydrocarbyl group" refers to a group having a carbon atom directly attached to the remainder of the molecule and having predominantly hydrocarbon character. "Group" and "moiety" as used herein are intended to be interchangeable. Examples of hydrocarbyl groups include: (a) hydrocarbon groups, that is, aliphatic substituents (e.g., alkyl or alkenyl), alicyclic substituents (e.g., cycloalkyl, cycloalkenyl), and aromatic-, aliphatic-, and alicyclic-substituted aromatic substituents, as well as cyclic substituents wherein the ring is completed through another portion of the molecule (e.g., two substituents together form an alicyclic moiety); (b) substituted hydrocarbon substituents, that is, substituents containing non-hydrocarbon groups which, in the context of this disclosure, do not materially alter the predominantly hydrocarbon character of the substituent (e.g., halo (especially chloro and fluoro), hydroxy, alkoxy, mercapto, alkylmercapto, nitro, nitroso, amino, alkylamino, and sulfoxy); and (c) hetero substituents, that is, substituents which, while having a predominantly hydrocarbon character, in the context of this disclosure, contain atoms other than carbon atoms in a ring or chain otherwise composed of carbon atoms. Heteroatoms may include sulfur, oxygen, and nitrogen, and hetero substituents encompass substituents such as pyridyl, furyl, thienyl, and imidazolyl.

In one embodiment of the present invention, the hydrocarbyl group is hydrocarbon group, such as aliphatic, alicyclic, and aromatic-, aliphatic-, and alicyclic-substituted aromatic group, as well as a cyclic substituent wherein the ring is completed through another portion of the molecule.

In an embodiment, the acid anhydride is selected from compounds of the formula: $R_1$—C(O)—O—C(O)—$R_2$, wherein $R_1$ and $R_2$ is each independently selected from an alkane containing from about 1 to about 19 carbon atoms. Such an alkane may be a linear chain, or a branched chain alkane. The hydrocarbon chain may be fully saturated, or it may be partially unsaturated. Examples of acid anhydrides of fully saturated hydrocarbon fatty acids include n-hexanoic acid anhydride, n-octanoic acid anhydride, n-decanoic acid anhydride, n-dodecanoic acid anhydride, lauric acid anhydride, n-tetradecanoic acid anhydride, myristic acid anhydride, n-hexadecanoic acid anhydride and palmitic acid anhydride.

In addition, anhydrides that may be used as curing agents may also be used to react with the epoxidized triglyceride to yield a grafted triglyceride of the present invention. Such anhydrides include, for example, aliphatic acid anhydrides, alicyclic acid anhydrides, and aromatic acid anhydrides.

The aliphatic acid anhydrides may include, for example, succinic anhydride, polyadipic anhydride, polyazelaic anhydride, and polysebacic anhydride.

The alicyclic acid anhydrides may include, for example, methyltetrahydrophthalic anhydride (MTHPA), methylhexahydrophthalic anhydride (MHHPA), methylhymic anhydride, hexahydrophthalic anhydride, tetrahydrophthalic anhydride, trialkyltetra-hydrophthalic anhydride and methylcyclohexenedicarboxylic anhydride.

The aromatic acid anhydrides may include, for example, phthalic anhydride, trimellitic anhydride, pyromellitic anhydride, benzophenonetetracarboxylic anhydride, ethyleneglycol bistrimellitate and glycerol tristrimellitate.

Additional exemplary anhydrides include 5-(2,5-dioxotetrahydrofuryl)-3-methyl-3-cyclohexen-1,2-dicarboxylic anhydride, benzophenonetetracarboxylic anhydride, biphenyltetracarboxylic dianhydride, chlorendic anhydride, diethylglutaric anhydride, dimethylglutaric anhydride, dodecenyl succinic anhydride (DDSA), endobicyclo-[2,2,1]-hepto-5-ene-2,3-dicarboxylic anhydride, endomethylene tetrahydrophthalic anhydride, glutaric anhydride, hexahydrophthalic anhydride, itaconic anhydride, maleic anhydride, methyl-endomethylene tetrahydrophthalic anhydride, methylnadic anhydride, nadic anhydride, nadic methyl anhydride (NMA), and mixtures of any of the foregoing.

[Grafted Triglycerides from Acid Anhydrides]

The epoxidized triglyceride is reacted with an acid anhydride or a mixture of acid anhydrides to generate a grafted triglyceride. Any reaction conditions may be used to generate the grafted triglyceride, as long as such conditions cause the epoxy groups on the epoxidized triglyceride react with at least one acid anhydride group. The grafted triglyceride may be prepared via a one-batch synthesis, wherein the epoxidized triglyceride is reacted with the acid anhydride. The molar ratio of the acid anhydride to the epoxidized triglyceride may be from about 0.1:1 to about 4:1, or about 1:1 to about 3.5:1, or about 2:1 to about 3:1.

An illustrative reaction of epoxidized soybean oil triglyceride and hexanoic anhydride is as follows.

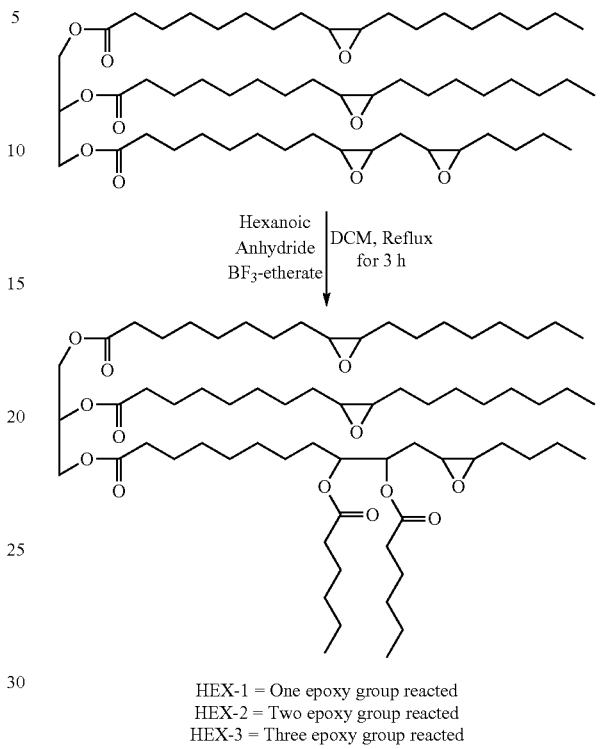

HEX-1 = One epoxy group reacted
HEX-2 = Two epoxy group reacted
HEX-3 = Three epoxy group reacted The reaction to prepare the grafted triglyceride may include additional ingredients beyond the epoxidized triglyceride and the acid anhydride. For example, the reaction may be performed in the presence of one or more catalysts. Such catalysts may include, for example, trivalent organic chromium complexes, phthalate esters, hydroquinone, boron trifluoride diethyl etherate and other suitable catalysts known to skilled person. Further, the reaction may be performed in an inert solvent, or it may be performed without a solvent. An exemplary solvent that may be used is methylene chloride.

The reaction of one mole of triglyceride with one mole of acid anhydride yields a grafted triglyceride, wherein the oxirane ring is replaced with two fatty acid residues each bonded to the epoxidized triglyceride via an ester bond. Thus, for example, a 1:3 reaction of an epoxidized triglyceride with an acid anhydride will result in a triglyceride grafted with a total of six fatty acid residues.

The diester derivatives of epoxidized triglyceride may be prepared by the reacting acid anhydride with epoxidized triglyceride in an anhydrous solvent. Boron trifluoride etherate may be used as catalyst to simultaneously open the oxirane ring and activate the acid anhydride. The reaction may be characterized as a straightforward ring opening reaction of the epoxy ring of epoxidized triglyceride, utilizing the acid anhydride as a nucleophilic reagent and the $BF_3$-etharete as a catalyst resulting in formation of diesters of the epoxidized triglyceride. Without being bound by theory, the reaction is believed to have the following mechanism:

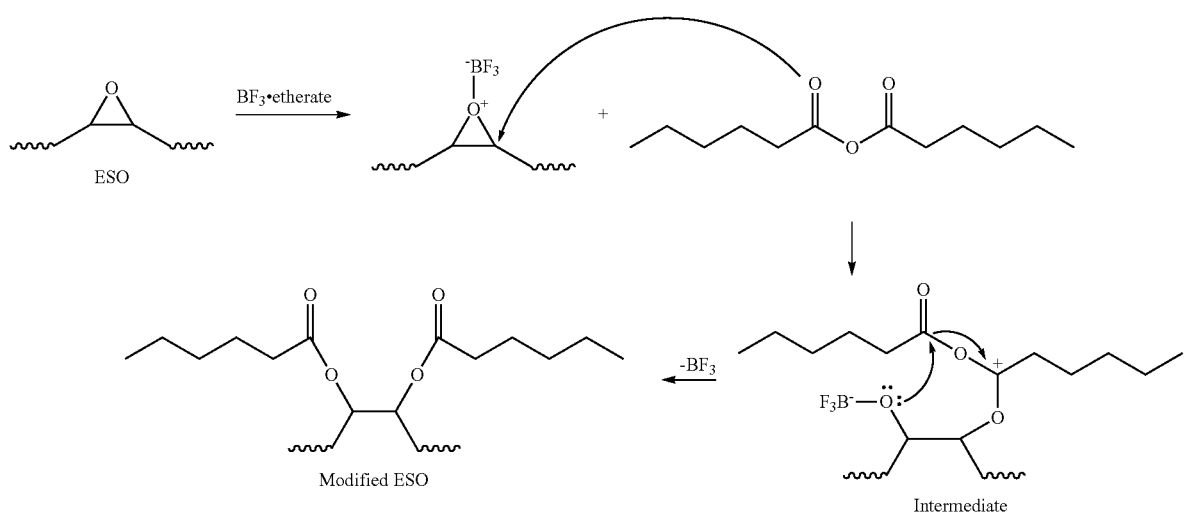

Modified ESO

Intermediate

The molar ratio of the epoxy groups in the epoxidized triglyceride to the acid anhydride groups may be varied to obtain grafted triglycerides with different numbers of fatty acid residues.

The reaction mixture is heated to a temperature to assure an essentially complete reaction. For example the reaction may be performed at a temperature in a range of from about 70° C. to about 90° C. for 1 to 6 hours. The reaction may be performed in a container in an oven, a Schlenk apparatus heated with an oil bath or a resistive heated mantel, or in a closed reaction vessel on a pilot or production plant.

The progress of the reaction may be monitored by acid number titration. In one embodiment, the reaction to produce the grafted triglyceride is carried out until the acid number of the reaction product is below a certain threshold, such as 10. In one embodiment of the present invention the threshold value is 5. It is believed that residual acid in the grafted triglyceride may have, in some cases, an adverse effect on the cured resin system and thus in such cases it is desirable to ensure that the grafted triglyceride has a low residual acid content. Other suitable conventional methods of monitoring the reaction known to a skilled person may also be used to ensure a low residual acid content in the grafted triglyceride including, for example, purification, neutralization, etc.

The aforementioned reaction converts the anhydride bond bridging two hydrocarbyl groups into two hydrocarbyl residues grafted to the epoxidized triglyceride. In another embodiment of the present invention, the anhydride bond is a part of a ring, which when reacted with the epoxide group, forms a ring on the triglyceride. Exemplary anhydride compounds include methylhexahydrophthalic anhydride, hexahydrophthalic anhydride, methyltetrahydrophthalic anhydride, phthalic anhydride, trimellitic anhydride, pyromellitic anhydride, benzophenone-3,3',4,4'-tetracarboxylic dianhydride, glycerol tris(trimellitate anhydride), maleic anhydride, tetrahydrophthalic anhydride, 3,6-endomethylene-1,2,3,6-tetrahydrophthalic anhydride, methyl endomethylene tetrahydrophthalic anhydride, dodecenyl succinic anhydride, hexahydrophthalic anhydride, hexahydro-4-methylphthalic anhydride, succinic anhydride, methylcyclohexene dicarboxylic anhydride, chlorendic anhydride, and mixtures thereof.

The epoxide thermoset formed with triglycerides that are grafted with residues of cyclic anhydrides appear to exhibit superior properties. Grafting of the fatty acid residues onto the epoxidized triglyceride with acid anhydride may be carried out under controlled conditions and/or using suitable amounts of reactants to react from 10-100% of the residual reactive epoxy groups on the epoxidized triglyceride with acid anhydride, or 30 to 80% of the epoxy groups are reacted, or 50 to 70% of the epoxy groups are reacted. In this manner, it is possible to retain some residual epoxy groups on the grafted triglyceride for further customization of the grafted triglyceride. Residual epoxy groups may then be used in the further reaction with the epoxide resin to customize the product.

The grafting of one of more fatty acid residues onto the triglycerides serves several important functions which can be used to tailor the triglyceride for toughening of various epoxy thermosets. Firstly, the fatty acid residues increase the molecular weight of the triglycerides. Secondly, the fatty acid residues reduce the polarity of the triglycerides. Both the molecular weight and the polarity of the triglycerides may be important since these properties determine whether the triglycerides phase separate from the epoxide resin used to make the epoxy thermoset of the present invention. Phase separation of the grafted triglycerides from the epoxide polymer is desirable since it may provide enhanced toughening of the epoxide thermoset. In this manner, a spectrum of tougheners having varying molecular weights, sizes, and relative activities have been formulated so that an appropriate toughener can be selected from this spectrum for use in a particular epoxy resin system.

The tailoring of the composition to exhibit the desired properties of the final epoxy thermoset may be performed by adjusting the molecular weights of the reactants and/or the reaction ratios of the acid anhydride to the epoxidized triglyceride. Suitable molecular weights of the grafted triglycerides may vary over a wide range, depending primarily on the identity of the epoxy resin. In one aspect, the molecular weight of the grafted triglyceride is tuned to substantially match the molecular weight of the epoxy resin in order to form a miscible system for curing, e.g. the molecular weight of the grafted triglyceride is within about 2000 g/mole of the molecular weight of the resin to be cured, more preferably, within about 1000 g/mole and most preferably, within about 500 g/mole of the molecular weight of the resin to be cured.

Suitable molecular weights for the grafted triglycerides are typically within a range of about 990 to about 3280 g/mole, preferably within the range of about 1200 to about 2000 g/mole and more preferably from about 1300 to about 1600 g/mole.

Although in one embodiment of the present invention the grafted triglyceride is a single compound, typically, the grafted triglyceride may be a mixture of a number of different compounds, each of which has the structure of a grafted triglyceride. Such a mixture typically contains a statistical distribution of compounds and may be obtained, for example, from natural products. For example, a reaction of two equivalents of acid anhydride with a triglyceride may yield a mixture of grafted triglycerides that contains a triglyceride compound with four fatty acid residues, but also smaller amounts of grafted triglycerides with two, six or eight fatty acid residues.

Grafted triglycerides obtained from a reaction of epoxidized triglyceride and a fatty acid differ from grafted triglycerides obtained from a reaction of epoxidized triglyceride and an acid anhydride, in that the former reaction grafts one fatty acid residue on the triglyceride per mole of fatty acid, whereas the latter reaction grafts two fatty residues on the triglyceride per mole of acid anhydride. This is because the reaction of an epoxidized triglyceride with an acid anhydride grafts two fatty residues onto a single oxirane site. In contrast, the reaction of an epoxidized triglyceride with a molar excess of fatty acid grafts only a single fatty acid residue on each epoxy sites. Thus, even though the empirical formula of the grafted triglyceride derived from 1 mole of epoxidized triglyceride with 1 mole of an acid anhydride will be the same as the empirical formula of the grafted triglyceride derived from 1 mole of epoxidized triglyceride with 2 moles of a fatty acid, the structural formulas will be different. Specifically, when reacting 1 mole of epoxidized triglyceride with 1 mole of acid anhydride, the two residues will attach to different epoxy groups. In the case of reacting 1 mole of epoxidized triglyceride with 2 moles of fatty acid the result is a graft on each of two different epoxy groups. Thus, in the case of reacting one acid anhydride molecule with 1 epoxy group of an epoxidized triglyceride molecule (containing four epoxy groups), three epoxy group will be remain, whereas in the case of reacting two fatty acid molecules with two different epoxy groups of an epoxidized triglyceride molecule (containing four epoxy groups), two epoxy groups will remain on the epoxidized triglyceride molecule.

Grafted triglycerides may alternatively be prepared from hydroxylated triglycerides or hydroxylated and epoxidized triglycerides. Hydroxylated triglycerides include naturally occurring oils, such as castor oil, as well as synthetic oils. Triglycerides that contain both hydroxyl and epoxide groups can be prepared as described elsewhere, and could be prepared from naturally hydroxylated oils, such as castor oil, naturally epoxidized oils, such as vernonia oil, or more common plant oils, such as soy bean oil and linseed oil.

[Epoxy Resin]

The grafted triglyceride blended with an epoxy resin is reacted with and an anhydride curing agent to generate a toughened epoxide thermoset. The epoxy resin which may be used to make the epoxy thermoset may be any commercially available epoxy resin. Epoxy resins are characterized by containing a 3-membered ring known as an epoxy, an epoxide, or an oxirane. Epoxy resins typically contain aliphatic, cycloaliphatic or aromatic backbones. Suitable epoxy resins include, but are not limited to bisphenol A epoxy resin, bisphenol F epoxy resin, novolac epoxy resins, aliphatic epoxy resins, glycidylamine epoxy resins, diglycidyl ether of bisphenol-A, epoxies of the phenol-novolac type and epoxies based on tetrabromobisphenol-A.

An example of an epoxy resin is a bisphenol-A diglycidyl ether epoxy resin ("DGEBA", or "BADGE") having the structure:

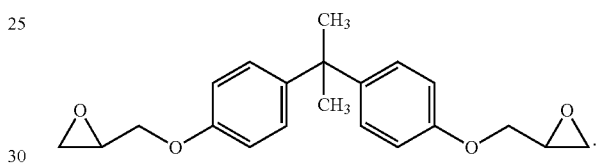

Another example of an epoxy resin is an oligomer of foregoing molecule, having the chemical structure:

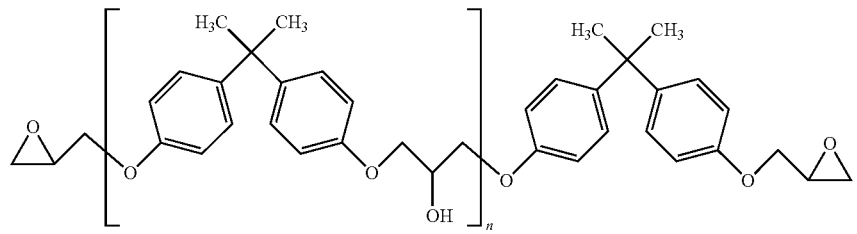

wherein n is a value between 0 and 25.

All of the resins mentioned above may be modified by methods known to skilled persons and still be used in the present invention. Suitable modifications include, but are not limited to, modifications to lower the acid, hydroxyl and/or anhydride number, or to increase flexibility, toughness, or increase the cross-link density of the resin, or to decrease flammability.

[Curing Agent]

Aside from the grafted triglyceride and the epoxy resin, the reaction used to form the epoxy thermoset also involves at least one anhydride curing agent. Suitable anhydride curing agents for epoxies are well known in the industry. Exemplary curing agents include methylhexahydrophthalic anhydride, hexahydrophthalic anhydride, methyltetrahydrophthalic anhydride, phthalic anhydride, trimellitic anhydride, pyromellitic anhydride, benzophenone-3,3',4,4'-tetracarboxylic dianhydride, glycerol tris(trimellitate anhydride), maleic anhydride, tetrahydrophthalic anhydride, 3,6-Endomethylene-1,2,3,6-tetrahydrophthalic anhydride, methyl endomethylene tetrahydrophthalic anhydride, dodecenyl succinic anhydride, hexahydrophthalic anhydride, hexahydro-4-methylphthalic anhydride, succinic anhydride, methylcyclohexene dicarboxylic anhydride, chlorendic anhydride, and mixtures thereof.

The grafted triglyceride makes up about 2 to about 30 wt % of the combination of the grafted triglyceride, resin, and the curing agent, or about 5 to about 20 wt %, or about 10 to about 15 wt %. The amount of grafted triglyceride may vary depending on a number of factors such as the type of resin, the type and amount of the anhydride curing agent, the type of grafted triglyceride, and the desired properties of the cured resin system. Factors such as the polarities and molecular weights of the grafted triglyceride and resin may also play a role in the selection of the amount of grafted triglyceride to be employed. Generally, an amount of grafted triglyceride is employed which exhibits a good miscibility with the resin and the anhydride curing agent when mixed, but that also sufficiently phase separates from the resin during curing to provide the desired toughening effect.

The experimental data given below shows that selected properties of epoxy thermosets can be significantly improved by reacting the epoxy resin with grafted triglycerides and anhydride curing agents, without sacrificing other key properties of the epoxy thermosets such as the glass transition temperature, viscosity and/or fracture toughness of composites made with the thermosets.

[Thermosets]

The preparation of the epoxy thermoset according to the present invention involves a reaction of: (a) a grafted triglyceride prepared by a reaction of an epoxidized triglyceride with a acid anhydride, wherein the acid anhydride contains from about 4 to about 40 carbon atoms per molecule; (b) an epoxy resin; and (c) an anhydride curing agent, wherein the weight ratio of the grafted triglyceride to the epoxy resin is in the range of about 1:99 to about 99:1.

The range of optimal ratios within the aforementioned range of about 1:99 to about 99:1 depends in a large part on the desired properties of the epoxy thermoset. For products wherein the epoxy thermoset is to have a high toughness, the weight ratio of the grafted triglyceride to the epoxy resin may be in the range of about 5:95 to about 30:70. For several epoxy thermosets, the ideal range appears to be 10:90 to 20:80. However, for a product that exhibits greater softness and is more rubbery, the ratio of the grafted triglyceride to the epoxy resin may be in a range of 50:50 to 80:20.

One method for the preparation of the epoxy thermoset is as follows. A blend of grafted triglyceride and epoxy resin may be prepared in a specific weight ratio (for example 1:99, 10:90, 15:85, 20:80 and 30:70). A stoichiometric amount of an anhydride curing agent and catalyst is added, and the blend is homogenized. Optionally, energy may be introduced into the blend to homogenize the blend. Such energy may be introduced via heating, radiation, high energy mixing or any combination thereof. Once all components were mixed, the mixture is degassed in a vacuum and poured into appropriate molds and cured at an elevated temperature for several minutes, or hours, or days to produce the epoxy thermoset. Optionally, the cured epoxy thermoset is post-cured at a higher temperature.

Dynamic mechanical analysis may be used to evaluate the stiffness and damping characteristics of thermosetting polymers. Without being bound by theory, a possible curing mechanism is as follows.

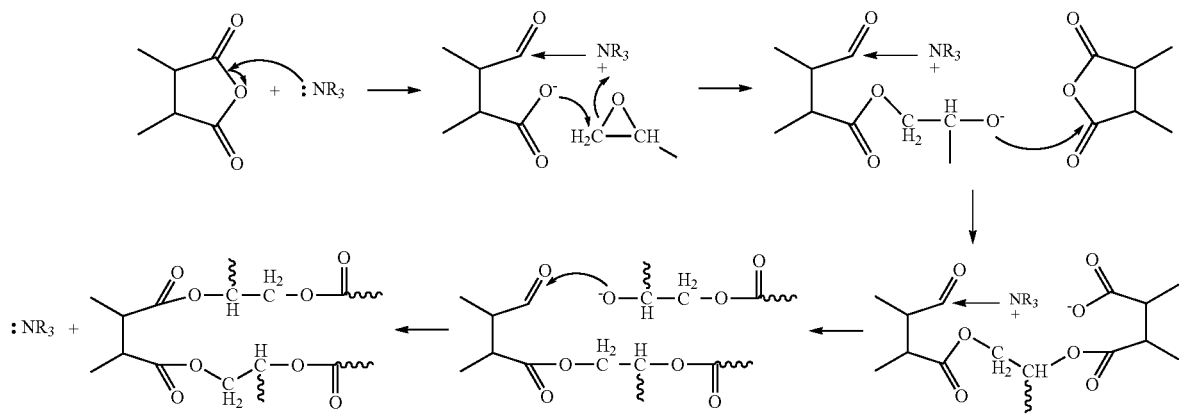

In another embodiment, the epoxide thermoset may be prepared without using the epoxy resin identified in subparagraph (b). The epoxide thermoset of this embodiment is prepared by reacting a grafted triglyceride and an anhydride curing agent. The curing agent may or may not be the same as the acid anhydride used to prepare the grafted triglyceride.

[Composites]

In another aspect, the present invention relates to composites comprising the epoxy thermoset described above. Such composites are formed from the cured resin system described above and may contain additives such as fibers, clays, silicates, fillers, whiskers or other conventional filler or reinforcing materials. Typical fibers used for such composites applications include but are not limited to E-glass, S-glass, Kevlar®, carbon fiber, and ultra-high molecular weight polyethylene. Additional additives that may be employed in conventional amounts and may be added directly to the process during formation of the composite, include colorants, pigments, carbon black, fibers such as glass fibers, carbon fibers and aramid fibers, fillers, impact modifiers, antioxidants, stabilizers, flame retardants, reheating aids, crystallization aids, oxygen scavengers, plasticizers, flexibilizers, nucleating agents, foaming agents, mold release agents, and combinations thereof.

The composites of the present invention may also include nano-materials dispersed in therein. A nano-material is any reinforcing material or mixture thereof, which has at least one dimension in the nanometer scale. Suitable nano-materials include, for example, nanoclays including, layered crystalline clays (such as natural or synthetic silicates like aluminum or aluminum-magnesium silicates), nano-fibers (such as cellulosic nano-fibers), nano-whiskers (such as cellulosic nano-whiskers), nanotubes (such as carbon or metal oxide nanotubes), nano-platelets (such as carbon nano-platelets), metallic oxides, metallic sulfides, metallic layered double hydroxides, or mixtures thereof.

Reinforcing materials may be treated with organophilic modifying compounds to enhance physical and chemical interaction between the reinforcing material and the resin. Organophilic modifying compounds are generally known in the art and include such interacting groups as, for example, amines, carboxylics, alcohols, phenols, silanes, organophilic ions, onium ions (ammonium, phosphonium, sulfonium and the like), etc.

The reinforcing material may be present in the nanocomposite in an amount that is suitable for imparting the desired effect of the reinforcing material without compromising other properties of the composite necessary for the application in which the composite is to be used. For example, the reinforcing material may be used to increase the fracture toughness of the composite, to modify the modulus of the composite and/or to modify the electrical conductivity of the composite. One skilled in the art can readily determine a suitable amount of reinforcing material.

The amount of reinforcing material in the composite may be from about 0.1 to about 75 weight percent based on the total weight of the composite, or from about 0.2 to about 30 weight percent, or from about 0.5 to about 20 weight percent, or from about 1 to about 10 weight percent. The amount of reinforcing material in particle filled (non-nano talc, silica, etc.) composites may be from about 0.1 to about 75 weight percent based on the total weight of the composite, or from about 0.2 to about 30 weight percent, or from about 1 to about 10 weight percent. The amount of reinforcing material in fiber reinforced composites may be from about 5 to about 90 weight percent based on the total weight of the composite, or from about 10 to about 80 weight percent, or from about 30 to about 75 weight percent.

The following examples are illustrative, but not limiting, of the present invention. Other suitable modifications and adaptations of the variety of conditions and parameters normally encountered in the field, and which are obvious to those skilled in the art, are within the scope of the disclosure.

EXAMPLES

Materials Used in the Examples.

All carboxylic acids, including n-hexanoic acid ($C_5H_{11}COOH$, "HEX", 99%), n-octanoic acid ($C_7H_{15}COOH$, "OCT", 99%), and n-decanoic acid ($C_9H_{19}COOH$, "DEC", 99%), were obtained from Sigma-Aldrich, USA. AMC-2 catalyst (Aerojet Chemicals, Rancho Cordova, Calif.), is a mixture of 50% trivalent organic chromium complexes and 50% phthalate esters. Drapex 6.8 (Galata Chemicals, Southbury, Conn., USA) is an epoxidized soybean oil ("ESO", CAS 8013-07-8). Boron trifluoride diethyl etherate, dimethyl benzyl amine, and hexanoic anhydride (97%) were obtained from Sigma-Aldrich (St. Louis, Mo., USA). Sodium chloride and sodium bicarbonate were obtained from Fisher Scientific. EPON™ Resin 828 (Miller Stephenson, Danbury, Conn., USA; CAS 25068-38-6) is an undiluted clear difunctional bisphenol A/epichlorohydrin derived liquid epoxy resin DGEBPA with a weight of 185-192 g/epoxide. EPON™ Resin 1001F (Miller Stephenson) is a low molecular weight solid epoxy resin derived from a liquid epoxy resin and bisphenol-A, with a weight of 525-550 g/epoxide. Methylhexahydrophthalic anhydride ("MHHPA", ANEW: 165) and ECA 100NC anhydride curing agent (ANEW: 168) was obtained from Dixie chemical, Pasadena, Tex., USA. ECA 100NC anhydride curing agent is a blend of >65% MHHPA, >10% hexahydrophthalic anhydride ("HHPA"), and <15% methyltetrahydrophthalic anhydride ("MTHPA"). All chemicals were used as received.

The chemical structures of ESO, hexanoic anhydride, boron trifluoride diethyl ether, DGEBA, HHPA, MHHPA, MTHPA, and dimethylbenzylamine ("DMBA") are shown below.

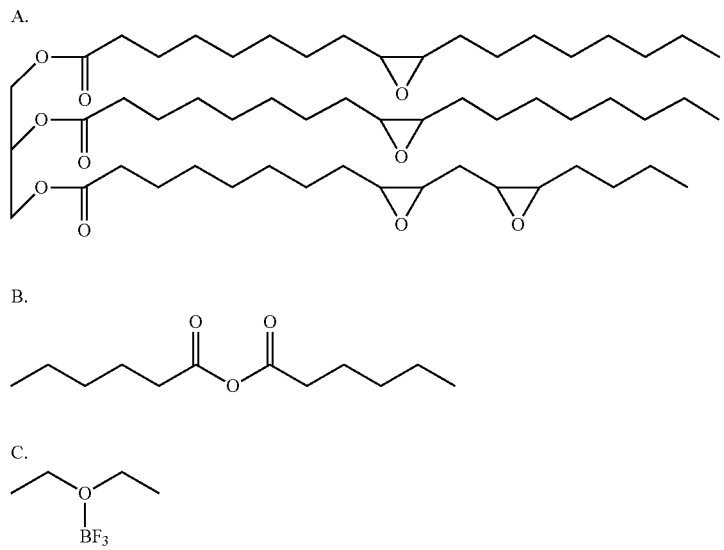

D.

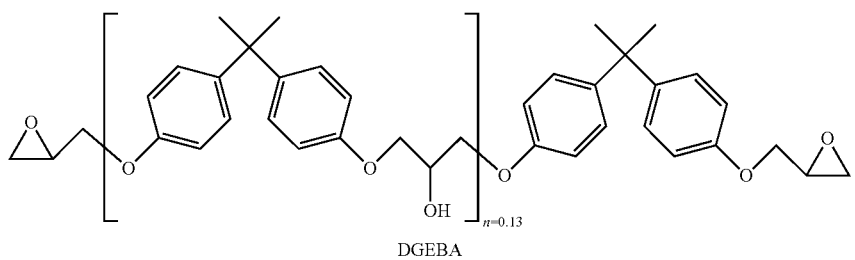

DGEBA

E.

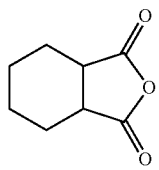

F.

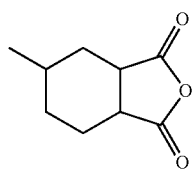

G.

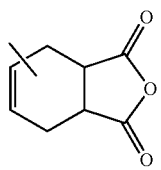

H.

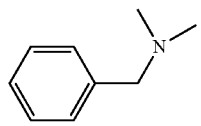

A. Epoxide soybean oil (ESO) (Drapex 68)
B. Hexanoic anhydride;
C. Boron trifluoride diethyl etherate ($BF_3$ etherate);
D. Diglycidyl ether of bisphenol A (DGEBA), EPON 828, $n = 0.13$;
E. Hexahydrophthalic anhydride;
F. Methylhexahydrophthalic anhydride;
G. Methyltetrahydrophthalic anhydride;
H. Dimethylbenzylamine (DMBA).

Example 1—Epoxy Equivalent Weight Determination

Experimental epoxy equivalent weight ("EEW") values of EPON 828, EPON 1001F, ESO and the prepared grafted triglycerides were determined by epoxy titration using ASTM D1652-97 procedure B. Theoretical EEW values were calculated on the basis of molecular weights.

The EEW values of EPON 828 and EPON 1001 were measured to be 188.0 (lit. 185-192), and 537.5 (lit. 525-550), respectively.

Example 2—Preparation of Grafted Epoxide Soybean Oil Using Fatty Acid

The grafted triglycerides HEX-1*, HEX-2*, HEX-3*, OCT-1*, OCT-2*, OCT-3*, DEC-1*, DEC-2*, and DEC-3* prepared and used in the examples below were grafted soybean oils, which were prepared by grafting the fatty acids: n-hexanoic acid, n-octanoic acid and n-decanoic acid to the backbone of epoxidized soybean oil ("ESO") in 1:1, 2:1, or 3:1 molar ratios. All grafted soybean oils were synthesized by a similar procedure with varying types and amounts of the fatty acids.

The identity of the grafted triglyceride is abbreviated in the tables below by a three-letter code followed by a number, and an asterisk (*) in order to indicate that these are comparative grafted triglycerides were prepared from fatty acids rather than fatty acid anhydrides. The three letter codes correspond to the parent carboxylic acid listed in the Materials section above, and the number signifies the number of equivalents of the carboxylic acid that was reacted with the epoxidized soybean oil, which is approximately equal to the number of fatty acid residues grafted onto the soybean oil. For example, "HEX-3*" corresponds to a grafted triglyceride that was obtained by reacting ESO with 3 equivalents of n-hexanoic acid, yielding a grafted triglyceride containing on average three —O—C(O)—$C_5H_{11}$ groups.

The, grafted triglyceride OCT-3* was prepared via a one-batch synthesis. 28.71 g ESO (30 mmol), 13.11 g octanoic acid (90 mmol), 418.20 mg AMC-2 (1 wt %) and 41.82 mg hydroquinone (0.1 wt %) were charged into a 500 mL three-necked round-bottomed flask equipped with a reflux condenser, a magnetic stirrer and a thermometer. The flask was sealed and the mixture was heated at 70° C. for 1 h, and at 90° C. for additional 3 h with continuous stirring. The resulting product was a light green liquid with a higher viscosity than the viscosity of ESO.

The modification of epoxidized triglyceride with a fatty acid in the presence of an anhydride curing agent for comparative purposes may be carried out via the reaction as shown below.

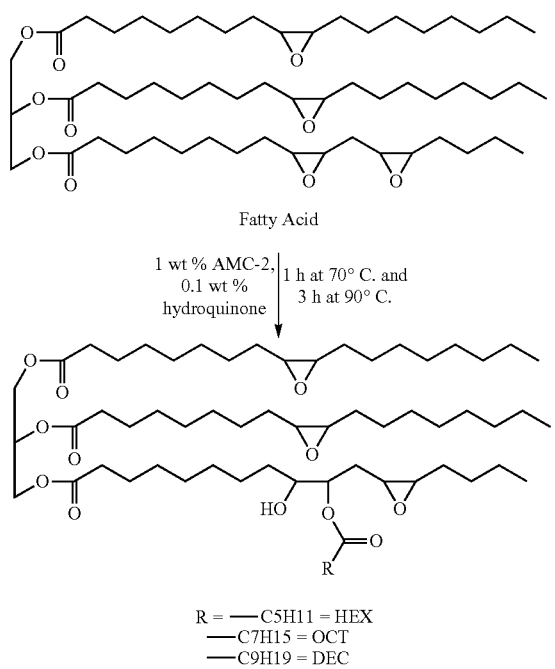

Other grafted triglycerides were prepared in a similar manner, adjusting the molar ratios as needed.

Alicyclic anhydride was also grafted onto ESO using the same method as was used to graft the acid anhydride onto ESO. The molecular weight of the residue was varied. Into a dry three-neck 250 mL round-bottom flask fitted with a condenser were placed 12.5 g of ESO (50 mmol of epoxy groups) and 2.1 g of methylhexahydrophthalic anhydride (MHHPA) (12.5 mmol, 4:1 mol equiv) in 100 mL of methylene chloride. Boron trifluoride etherate (0.125 g, 0.88 mmol) was added and the mixture was refluxed for 3 hours under a dry nitrogen atmosphere. The mole ratio of epoxy groups in the ESO to methylhexahydrophthalic anhydride was 4:2 for MHPA-2 and 4:3 for MHPA-3. After the reaction mixture was cooled to room temperature, the product was purified by washing three times each with 100 mL of 5% NaHCO$_3$ solution followed by 100 mL of brine solution. The methylene chloride layer was dried with anhydrous magnesium sulfate overnight. The solvent was removed by rotary evaporation.

Example 3—Preparation of Grafted Epoxide Soybean Oil Using Anhydride

The grafted triglycerides prepared and used in the examples below were grafted soybean oils, which were prepared by grafting fatty acid residues from an anhydride of the fatty acid to the backbone of ESO.

The identity of the grafted triglyceride is abbreviated in the tables below by "HEX" followed by a number. However, unlike the preparation of the grafted ESO by the use of fatty acids mentioned above, the absence of an asterisk indicates that these are compositions in accordance with the present invention prepared from fatty acid anhydrides. The three letter code (e.g. "HEX"), without an asterisk, corresponds to the parent hexanoic anhydride, and the number signifies the number of equivalents of the anhydride that was reacted with the epoxidized soybean oil. For example, "HEX-3" corresponds to a grafted triglyceride that was obtained by reacting ESO with 3 equivalents of hexanoic anhydride, yielding a grafted triglyceride containing on average six —O—C(O)—$C_5H_{11}$ groups.

Three grafted triglycerides were prepared by reaction of an epoxidized soybean oil triglyceride with hexanoic anhydride at molar ratios of 1:1, 1:2, and 1:3. As an example, grafted triglyceride HEX-1 was prepared via a one-batch synthesis. 12.5 g ESO (12.5 g ESO (50 mmol of epoxy groups), 2.678 g of hexanoic anhydride (12.5 mmol) and 100 mL of methylene chloride were charged to a three-neck 250-mL round-bottom flask fitted with a reflux condenser, a magnetic stirrer and a thermometer. Boron trifluoride etherate (0.125 g, 0.88 mmol) was added and the mixture was refluxed for 3 h under a dry nitrogen atmosphere. After the reaction mixture cooled to room temperature, the product was purified by washing three times, each with 100 mL of 5% NaHCO$_3$ solution followed by 100 mL of brine solution. The methylene chloride layer was dried over anhydrous magnesium sulfate overnight, and the solvent was removed by rotary evaporation.

Other grafted triglycerides were prepared in a similar manner, adjusting the molar ratios as needed.

Alicyclic anhydride was also grafted onto ESO using the same method as was used to graft the acid anhydride onto ESO. The molecular weight of the residue was varied. Into a dry three-neck 250 mL round-bottom flask fitted with a condenser were placed 12.5 g of ESO (50 mmol of epoxy groups) and 2.1 g of methylhexahydrophthalic anhydride (MHHPA) (12.5 mmol, 4:1 mol equiv) in 100 mL of methylene chloride. Boron trifluoride etherate (0.125 g, 0.88 mmol) was added and the mixture was refluxed for 3 hours under a dry nitrogen atmosphere. The mole ratio of epoxy groups in the ESO to methylhexahydrophthalic anhydride was 4:2 for MHPA-2 and 4:3 for MHPA-3. After the reaction mixture was cooled to room temperature, the product was purified by washing three times each with 100 mL of 5% NaHCO$_3$ solution followed by 100 mL of brine solution. The methylene chloride layer was dried with anhydrous magnesium sulfate overnight. The solvent was removed by rotary evaporation.

Example 4—Characterization of the Grafted Triglyceride

Mid-IR was used to identify functional groups of grafted triglycerides on a Thermo Nicolet Nexus 870 FT-IR spectrometer in absorbance mode with 32 scans and an 8 cm$^{-1}$ resolution at room temperature with a deuterated triglycine sulfate (DTGS) detector in the 650 to 4000 cm$^{-1}$ range.

The extent of epoxy ring opening was determined from the intensity ratio of the epoxy peak at 842 and 823 cm$^{-1}$ from the mid IR spectra. The epoxy peak appears to be of lower intensity in the case of HEX-1 HEX-2 and HEX-3 compared to the pure ESO. This may be due to the increase in ester functionalities in the structure. In the case of HEX-3, three epoxy groups of ESO were converted to diester derivatives of hexanoic anhydride by the ring opening reaction. This observation is consistent with the increase in peak intensity ratio at 1461:1375, confirming the formation of diester derivatives of hexanoic anhydride.

The FTIR spectra of the grafted triglycerides displayed the peaks for the triglyceride carbonyl stretching vibration at 1740 cm$^{-1}$, $CH_2$ bending vibration at 1461 cm$^{-1}$, $CH_3$ symmetrical bending vibration at 1375 cm$^{-1}$, and peaks at 1240, 1158, and 1100 cm$^{-1}$ due to stretching vibrations of C—O group in the esters.

Epoxy titration was conducted by following ASTM D 1652-97 procedure B to evaluate the epoxy equivalent weight ("EEW") of ESO and the prepared grafted triglycerides HEX-1, HEX-2, and HEX-3. As an example, a solution was prepared with 0.4 g HEX-1, 10 mL methylene chloride, 10 mL tetraethylammonium bromide solution (0.25 g/mL) and 8 drops of 0.1% solution of crystal violet indicator in glacial acetic acid. The solution was titrated with perchloric acid (0.1 N). The solution exhibited a sharp color change from blue to green and the volume of perchloric acid reagent consumed was recorded for calculation of EEW. Multiple titrations were performed. The experimental and theoretical EEW of ESO and the three prepared grafted triglycerides is shown in Table 1 below. The values of EEW and molecular weight of grafted ESO tends to increase with the number of epoxy group on ESO.

The viscosity of ESO and the viscosities of the grafted triglycerides were measured using a TA AR2000ex Rheometer (TA Instruments, New Castle, Del., USA) with a 40 mm flat plate configuration at room temperature. Samples were tested at a shear rate ranging from 0.01 to 1000 s$^{-1}$ with 10 measurements recorded at each decade. Shear stress was recorded every 2 s at each shear rate. The average of three measurements at the shear rate of 1000 s$^{-1}$ was reported as the viscosity value, and these viscosity values are reported in Table 1 below. The modifications of ESO do not significantly alter the viscosity. There were no significant changes in the viscosity of grafted ESO (Table 1), which is one of advantages of these materials for further processing.

TABLE 1

EEW and Viscosity data of ESO and grafted ESO.

| | Theoretical EEW | Experimental EEW | Viscosity (Pa · s) |
|---|---|---|---|
| ESO | 250.0 | 249.0 | 0.30 |
| HEX-1 | 352.0 | 609.8 | 0.25 |
| HEX-2 | 635.0 | 869.5 | 0.37 |
| HEX-3 | 1484.0 | 1216.9 | 0.43 |

Example 5—Preparation of Epoxy Thermosets

Eleven comparative compositions were prepared. The comparative compositions were epoxy thermosets comprising ESO grafted with fatty acid, plus control epoxy thermosets. Blends of fatty acid grafted ESO (HEX-1*, HEX-2*, HEX-3*, OCT-1*, OCT-2*, OCT-3*, DEC-1*, DEC-2*, and DEC-3*) and DGEBA were prepared at a 25:75 weight ratio and mixed using a THINKY planetary mixer at 1800 rpm for 4 min. The mixture was then degassed at 1800 rpm for 2 min. A stoichiometric amount (0.9 molar equivalents) of anhydride curing agent ECA 100NC or MHHPA, and 2 wt % of the catalyst dimethyl benzyl amine catalyst were added to the mixture and mixed under similar mixing conditions. After all components were mixed, the mixture was degassed for 5 minutes in a vacuum oven, the mixture was poured into 140 mm×14 mm×6 mm (or 40 mm×10 mm×5 mm) rubber molds, was cured for 9 h at 90° C., and was post-cured for 9 h at 200° C.

Compositions according to the invention were prepared which were epoxy thermosets comprising ESO grafted with anhydrides, plus some control epoxy thermosets were also prepared for comparative purposes. Blends of grafted ESO (HEX-1, HEX-2 and HEX-3) and DGEBA were prepared at one of several different weight ratios (10:90, 15:85, 20:80 and 25:75) and mixed using a THINKY planetary mixer at 1800 rpm for 4 min. The mixture was then degassed at 1800 rpm for 2 min. A stoichiometric amount (0.9 molar equivalents) of anhydride curing agent ECA 100NC or MHHPA, and 2 wt % of the catalyst dimethyl benzyl amine catalyst were added to the mixture and mixed under similar mixing conditions. After all components were mixed, the mixture was degassed for 5 minutes in a vacuum oven, the mixture was poured into 140 mm×14 mm×6 mm (or 40 mm×10 mm×5 mm) rubber molds, was cured for 9 h at 90° C., and was postcured for 9 h at 200° C.

The effects of the molecular weight of the epoxide on the properties of the resulting thermosets were ascertained by blending 65 parts by weight of DGEBA and 15 parts by weight of EPON 1001F, heating the resulting blend to 80° C. for 6 hours, and treating this blend with 20 parts by weight of grafted triglyceride and a curing agent, in a similar manner as described above.

In the tables below, the thermosets were designated on the basis of their composition. For instance, "15% HEX-2-DGEBA-EC" represents thermoset samples prepared from a mixture of 15 parts of ESO grafted with 4 hexanoic fatty acid residues, 85 parts of DGEBA, cured with a stoichiometric amount of ECA 100NC.

The blends of DGEBA and modified ESO (MHPA-1, MHPA-2 and MHPA-3) were prepared by using different weight ratios (10:90, 15:85, and 20:80) with a stoichiometric amount (0.9 mole ration) of anhydride hardener (MHHPA), and 2 parts by weight of dimethyl benzyl amine catalyst in a similar manner as above. The MHHPA was the same hardener as the reactant used with the epoxidized ESO. The mixing, degassing, curing, and post curing steps were also performed as described above.

Example 6—Thermoset Properties

All cured epoxy samples were sanded to a standard size and shape. Thermomechanical properties, including glass transition temperature ($T_g$) and storage modulus at room temperature, of cured samples were measured using a TA Instruments Q800 Dynamic Mechanical Analysis ("DMA") apparatus in single cantilever geometry. DMA was mainly used to investigate the stiffness and damping characteristics of thermosetting polymers. Thermoset samples with approximate dimensions of 38 mm×9 mm×4.5 mm were examined with a ramp rate of 2° C./min from room temperature to 220° C. as well as at a frequency of 1 Hz and an amplitude of 15 μm. $T_g$ was assigned as the temperature at the maximum of the loss modulus curve. Fracture toughness properties, such as critical strain energy release rate (GO and critical stress intensity factor (KO, of thermoset samples were measured using an INSTRON 8872 Servohydraulic Fatigue Testing System (Norwood, Mass., USA) by following ASTM 5045-99. CT samples were processed to dimensions of 16 mm×13 mm×5.5 mm and an 8.2 mm long notch was cut into each sample by a diamond saw. A pre-crack was made at the base of the notch by manually scoring with a sharp blade at room temperature before such samples were tested using the INSTRON 8872 in an ambient environment (64% relative humidity) with a constant crosshead speed of 1 mm/min and a termination criteria of 1 mm tensile extension.

For SEM measurements, fracture surfaces of cured epoxy samples were coated with platinum using a Cressington sputter coater at 40 mA for 30 s to an expected thickness of 7-9 nm. Images were taken with an FEI XL30 ESEM and a Zeiss Supra 50VP SEM. Fracture toughness was measured using ASTM D5045-99(2007)e1 with the Single Edge Notched Bend methodology on 51 mm×13 mm×6 mm samples.

Figure 2:
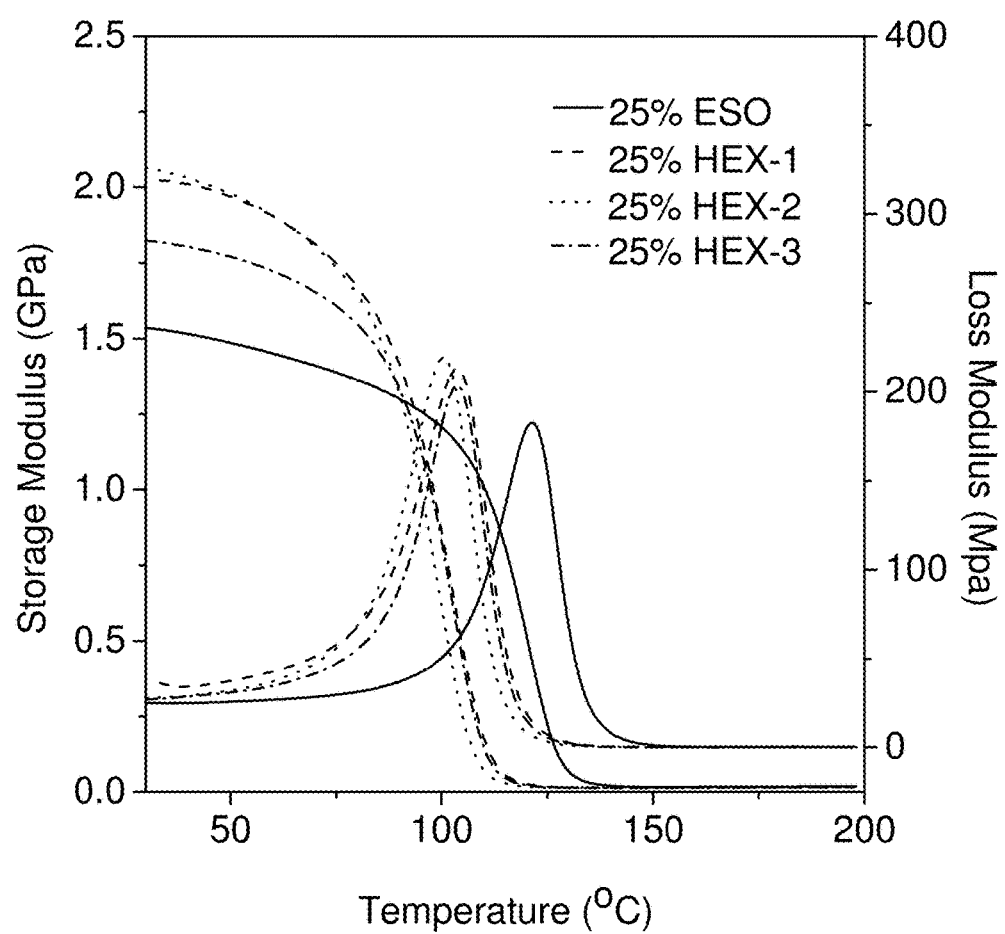
FIG. 2 shows DMA thermograms of ECA100NC cured thermosetting samples toughened with 20 wt % of fatty acid modified ESO.
Figure 2:
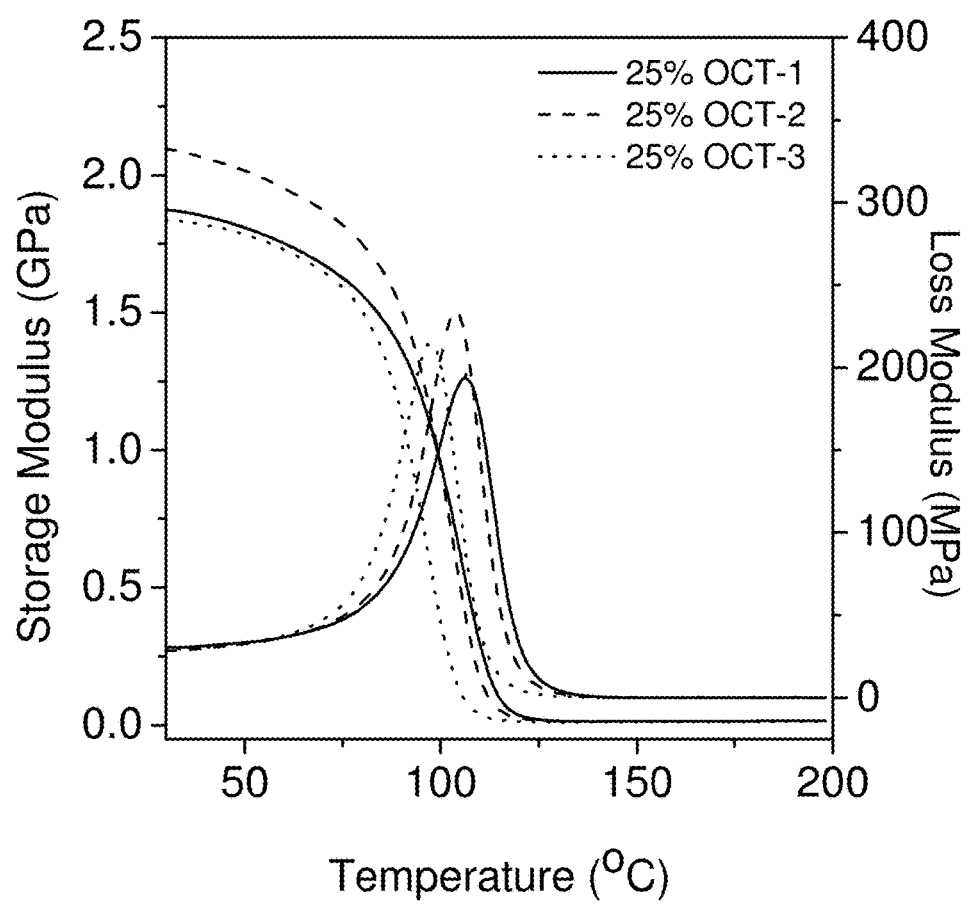
Figure 2:
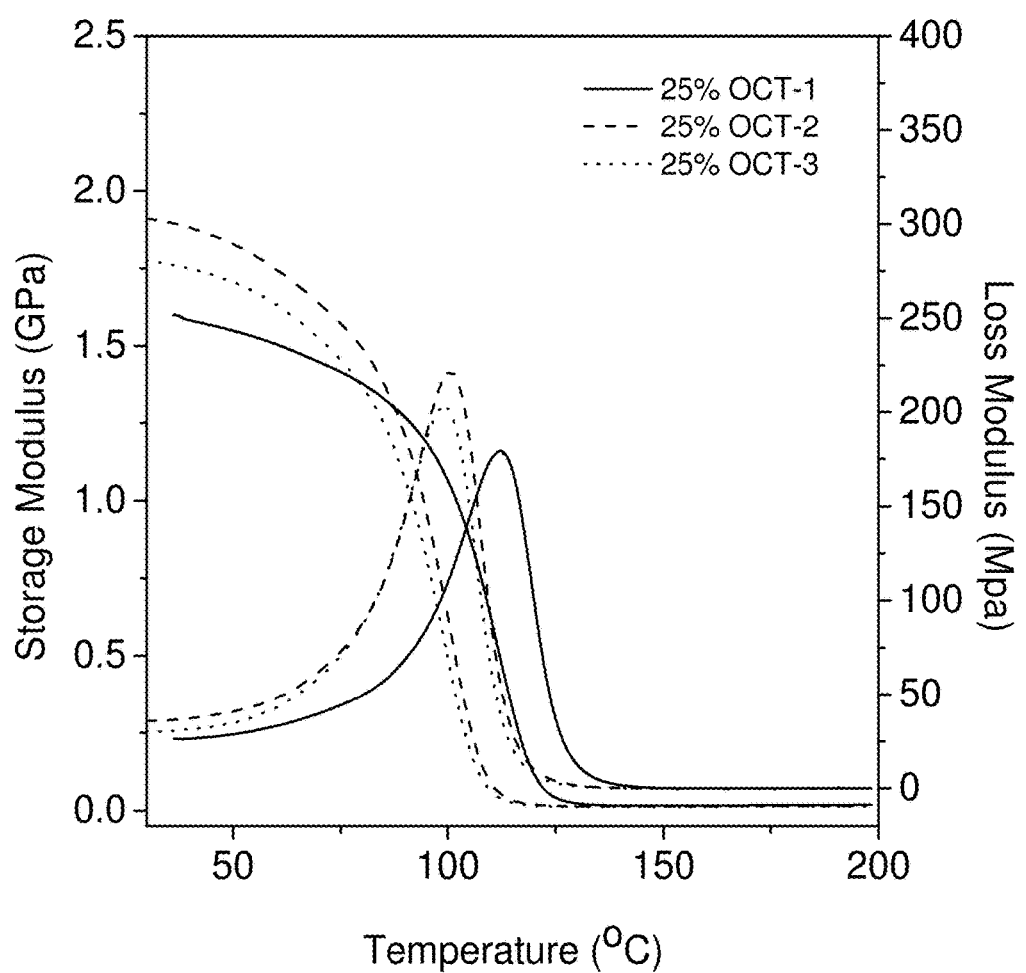

For the comparative epoxy resins, no microscopic phase separation was observed at any loading level. The DMA thermograms of ECA 100NC cured thermosetting samples toughened with 20 wt % of fatty acid grafted ESO are shown in FIG. 2. The storage modulus at room temperature and the glass transition temperature of neat and toughened thermosetting polymers with fatty acid grafted ESO tougheners is presented in Table 2.

TABLE 2

Storage modulus at room temperature and glass transition temperature $T_g$ of neat and toughened thermosetting polymers with fatty acid grafted ESO tougheners.

| Sample Code | Storage Modulus (GPa) | Modulus $T_g$ (Loss) | $T_g$ (Tan Delta) |
|---|---|---|---|
| 100% DGEBA-EC | 2.03 | 136° C. | 144° C. |
| 25% ESO-75% DGEBA-EC | 1.67 | 121° C. | 130° C. |
| 25% HEX-1*-75% DGEBA-EC | 2.02 | 104° C. | 115° C. |
| 25% HEX-2*-75% DGEBA-EC | 2.06 | 101° C. | 111° C. |
| 25% HEX-3*-75% DGEBA-EC | 1.82 | 104° C. | 114° C. |
| 25% OCT-1*-75% DGEBA-EC | 1.87 | 106° C. | 117° C. |
| 25% OCT-2*-75% DGEBA-EC | 2.09 | 104° C. | 114° C. |
| 25% OCT-3*-75% DGEBA-EC | 1.83 | 98° C. | 108° C. |
| 25% DEC-1*-75% DGEBA-EC | 1.60 | 111° C. | 123° C. |
| 25% DEC-2*-75% DGEBA-EC | 1.91 | 101° C. | 112° C. |
| 25% DEC-3*-75% DGEBA-EC | 1.77 | 99° C. | 111° C. |

The DMA analysis of the anhydride cured DGEBA with various amount of grafted ESO is presented in Table 3 below. The dynamic mechanical properties such as storage modulus, loss modulus, and the mechanical loss factor of the anhydride cured thermosetting epoxy polymer system cured with grafted soybean oil were measured from 0° C. to 200° C. The change of storage modulus and loss modulus of samples are display in FIG. 3 and are summarized in Table 3.

Figure 3:
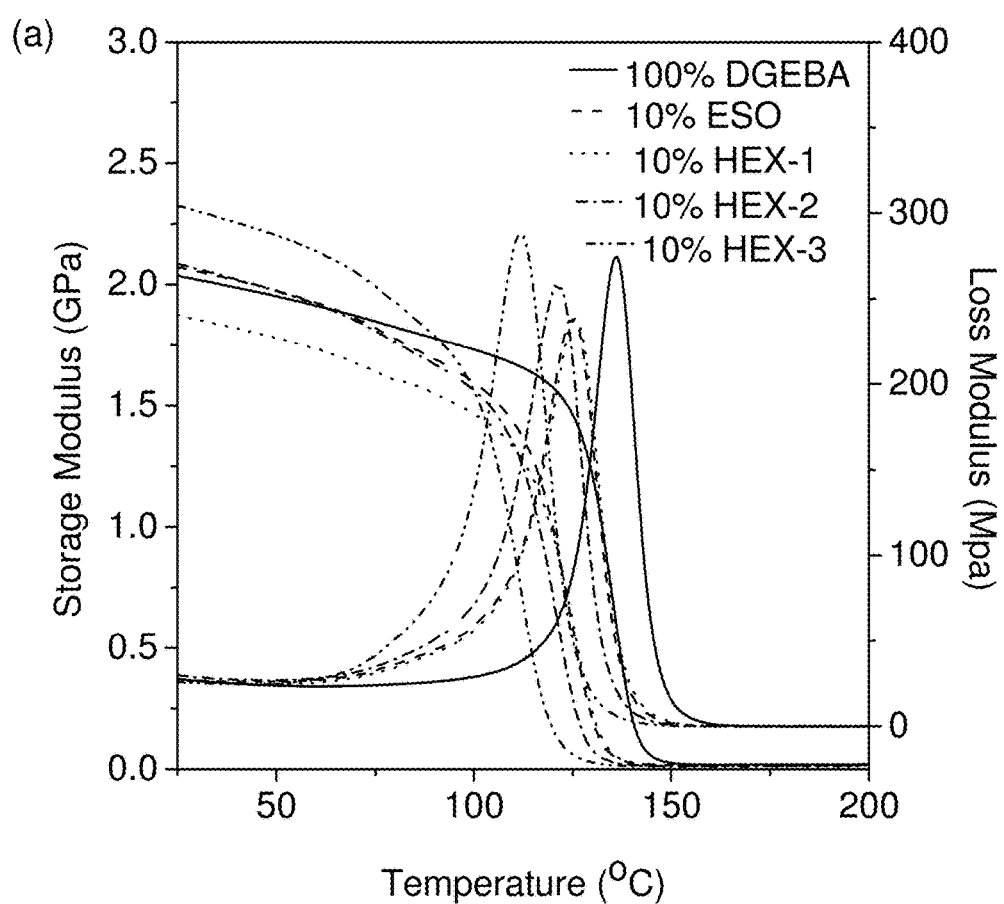
FIG. 3 shows DMA thermograms of ECA100NC cured thermosetting samples toughened with 10, 15, 20 and 25 wt % of ESO and modified ESO.
Figure 3:
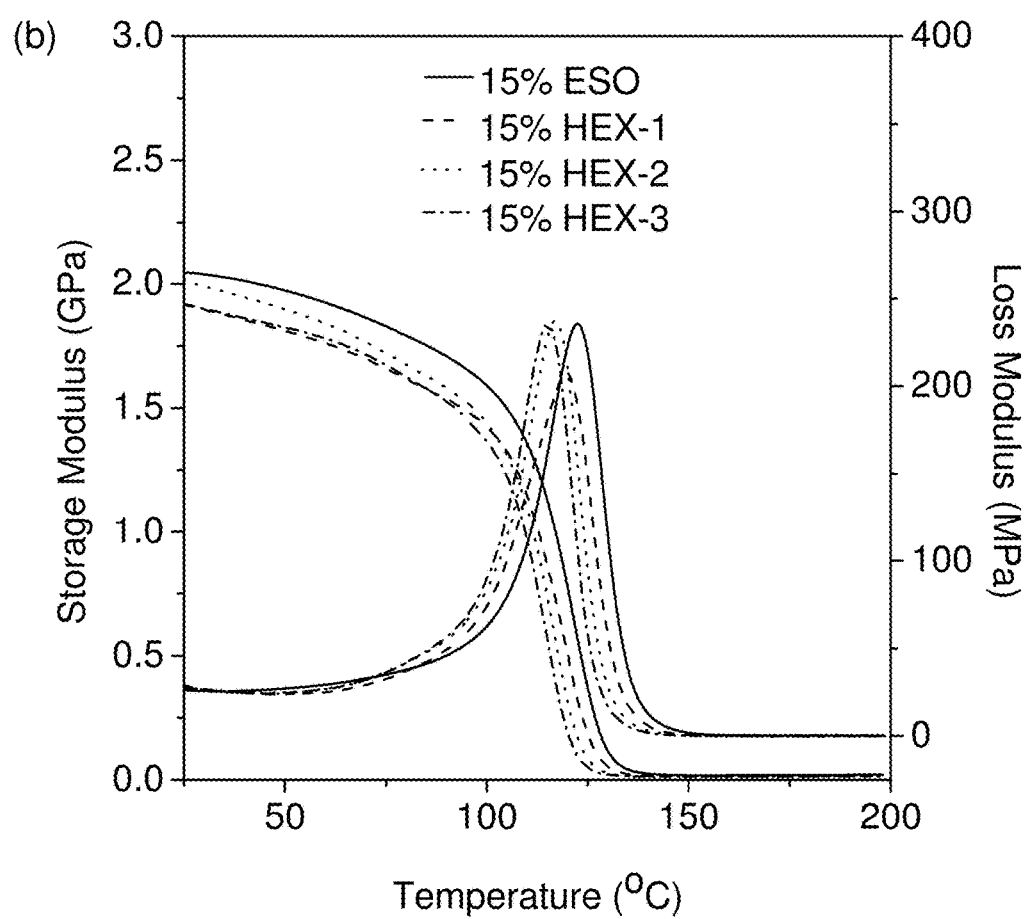
Figure 3:
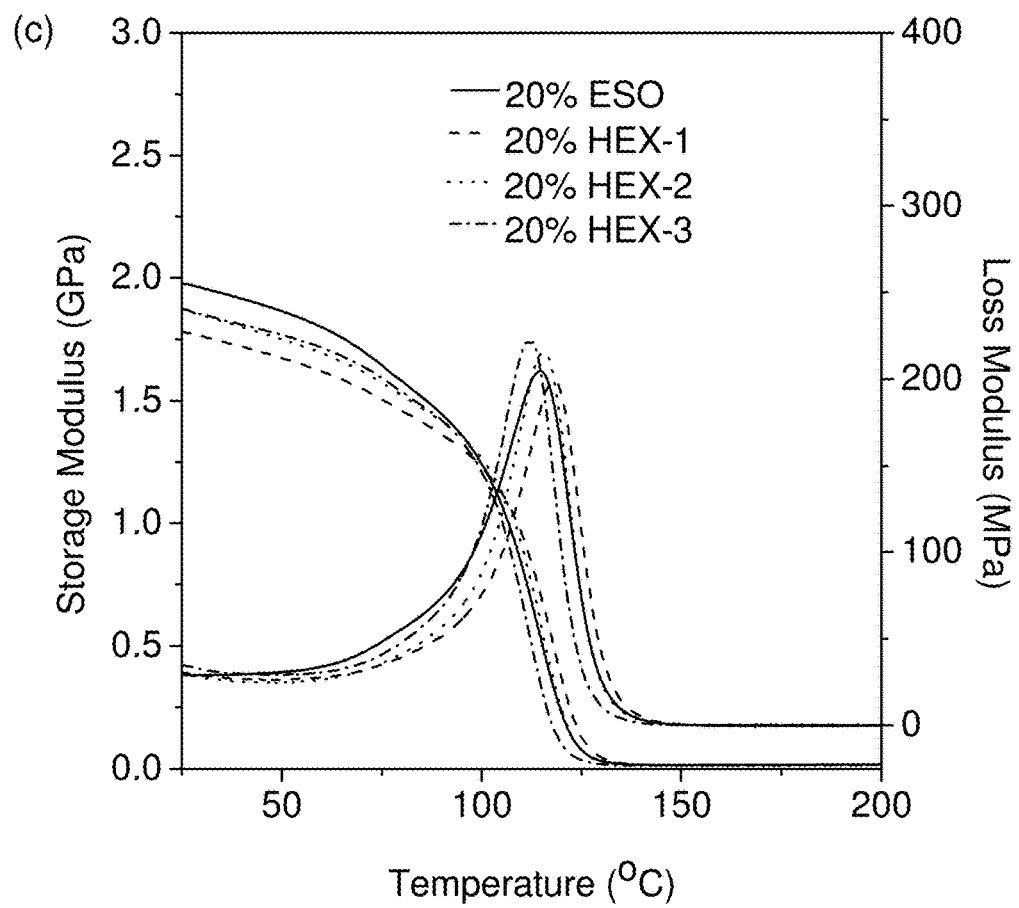
Figure 3:
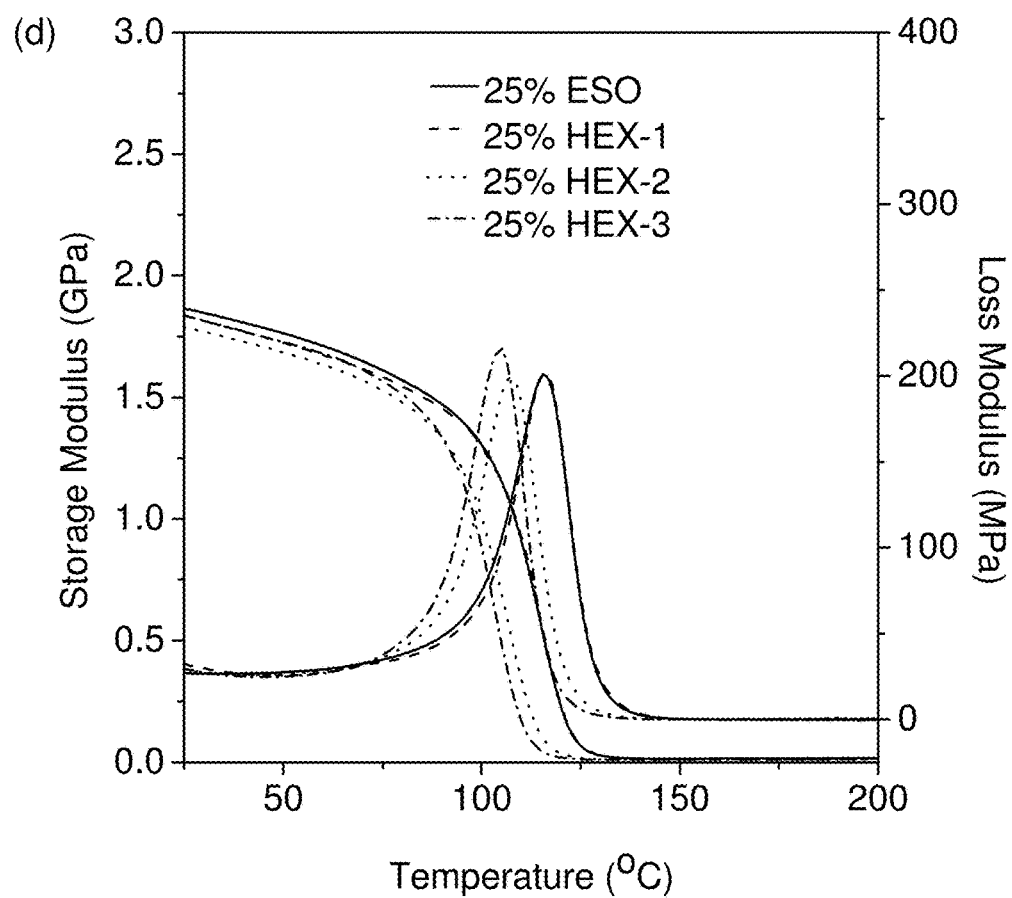

FIG. 3 illustrates the relationship between the loss modulus of the cured thermosetting epoxy system and temperature. The curves for all of the samples exhibited a narrow peak. The loss modulus peaks for grafted ESO with a higher number of hexanoic acid residues exhibited peaks at a lower temperature, indicating a lower glass transition temperature, due to the greater flexibility afforded by the grafted ESO chains.

For all samples of epoxy thermosets cured with ECA 100NC, the storage modulus values were constant at a lower temperature. However a sharp drop was observed around at 100° C., which was followed by a modulus plateau at a higher temperature. The storage modulus values for the samples were obtained at room temperature in the range of 1.75 GPa to 2.00 GPa. These values are similar to values of materials that are used in high performance applications. In general, the storage modulus values of blended samples were lower than those of the neat epoxy system. This change in storage modulus may be due to the incorporation of less stiff ESO and diester of ESO toughener. Interestingly, in the case of the epoxy resin designated 10% HEX-3-90% DGEBA-EC, the value of storage modulus was 2.32 GPa, which is higher than neat DGEBA cured with ECA 100 NC.

Dynamic mechanical loss factor (tan delta) versus temperature of pure DGEBA, and various weight parts (10, 15, 20 and 25 parts) of grafted ESO are also shown in Table 3. The loss tangent peak is related to the molecular motion of polymeric chains within the structure. The lower the mobility of polymeric chains, the lower the peak tan delta value. The neat DGEBA cured with ECA 100NC exhibited a glass transition temperature at 143.5° C., whereas for epoxy thermosets comprising 10, 15, 20 or 25 parts by weight of HEX-1, the glass transition temperatures were 135° C., 129° C., 129° C., or 126° C., respectively. A similar trend is observed for epoxy thermosets that are formed with HEX-2 or HEX-3. The incorporation of grafted ESO in DGEBA results in a lower glass transition temperature due to the lower cross-linking density of the cured network system. The glass transition temperature was lower for anhydride-cured epoxy systems with higher amounts of grafted ESO. Further, the glass transition temperature was lower for anhydride-cured epoxy systems with higher amounts of grafted fatty acids on ESO. For example, epoxy resins comprising 10 parts by weight of HEX-1, HEX-2 and HEX-3 cured with ECA 100NC exhibited glass transition temperatures in a decreasing order of 135° C., 131° C. and 123° C., respectively. The higher molecular weight of grafted ESO may have also played a role in providing the lower glass transition temperatures of the HEX-2 and HEX-3 series epoxy thermosets, as compared to the HEX-1 series epoxy thermosets. Further, the incorporation of ungrafted ESO in a DGEBA cured system also resulted in a lower glass transition temperature with higher amounts of ungrafted ESO in the system.

TABLE 3

Storage modulus at room temperature and $T_g$ of neat and toughened thermosetting epoxies with grafted ESO tougheners.

| Sample Code | Storage Modulus (GPa) | Modulus $T_g$ (Loss) | $T_g$ (Tan Delta) |
|---|---|---|---|
| 100% DGEBA-EC | 2.03 | 136° C. | 144° C. |
| 10% ESO-90% DGEBA-EC | 2.06 | 125° C. | 134° C. |
| 10% HEX-1-90% DGEBA-EC | 1.88 | 125° C. | 135° C. |
| 10% HEX-2-90% DGEBA-EC | 2.07 | 121° C. | 131° C. |
| 10% HEX-3-90% DGEBA-EC | 2.32 | 111° C. | 123° C. |
| 15% ESO-85% DGEBA-EC | 2.04 | 122° C. | 132° C. |
| 15% HEX-1-85% DGEBA-EC | 1.90 | 120° C. | 130° C. |
| 15% HEX-2-85% DGEBA-EC | 2.00 | 117° C. | 127° C. |
| 15% HEX-3-85% DGEBA-EC | 1.91 | 115° C. | 125° C. |
| 20% ESO-80% DGEBA-EC | 1.98 | 115° C. | 125° C. |
| 20% HEX-1-80% DGEBA-EC | 1.78 | 118° C. | 128° C. |
| 20% HEX-2-80% DGEBA-EC | 1.86 | 116° C. | 126° C. |
| 20% HEX-3-80% DGEBA-EC | 1.87 | 112° C. | 122° C. |
| 25% ESO-75% DGEBA-EC | 1.85 | 116° C. | 125° C. |
| 25% HEX-1-75% DGEBA-EC | 1.83 | 116° C. | 126° C. |

TABLE 3-continued

Storage modulus at room temperature and $T_g$ of neat and toughened thermosetting epoxies with grafted ESO tougheners.

| Sample Code | Storage Modulus (GPa) | Modulus $T_g$ (Loss) | $T_g$ (Tan Delta) |
|---|---|---|---|
| 25% HEX-2-75% DGEBA-EC | 1.78 | 107° C. | 118° C. |
| 25% HEX-3-75% DGEBA-EC | 1.83 | 105° C. | 115° C. |

Figure 4:
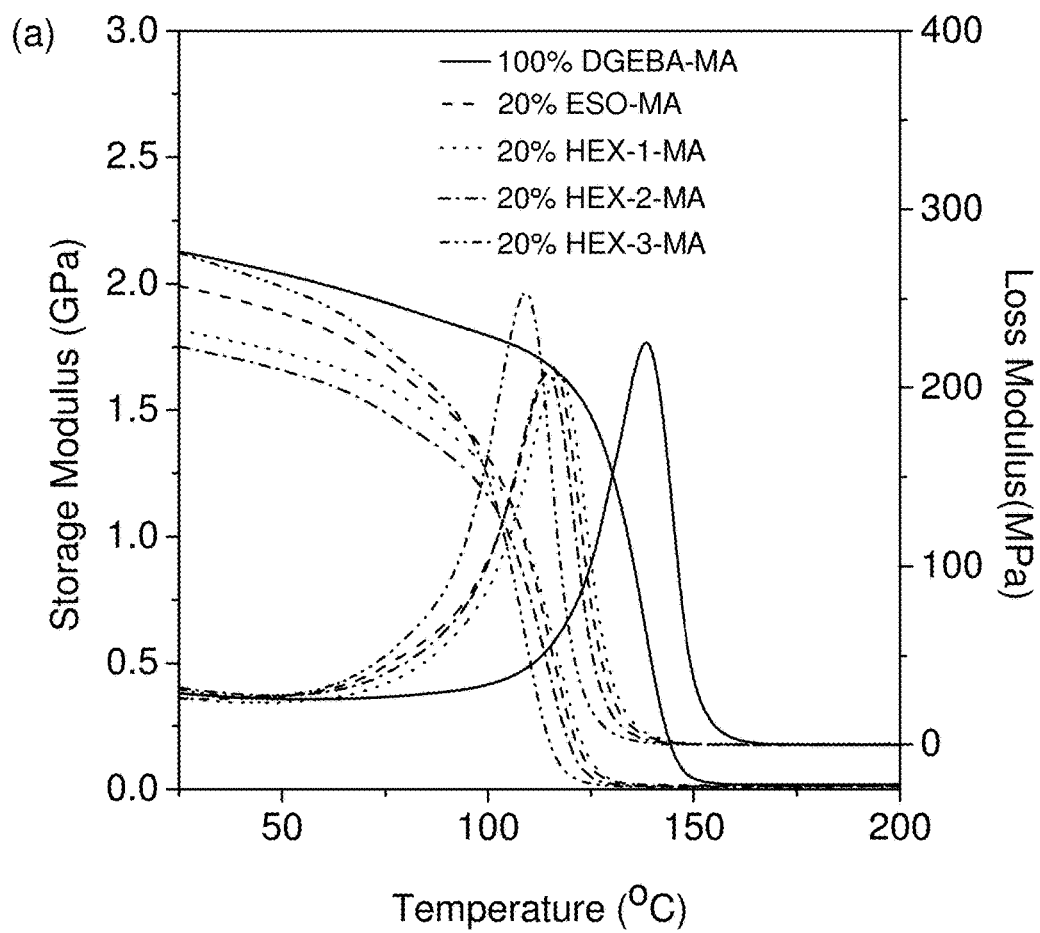
FIG. 4 shows DMA Thermograms of: (a) MHHPA cured thermosetting samples toughened with 20 wt % modified ESO tougheners, (b, c) 15 wt % EPON 1001F blended and toughened with 20 wt % modified ESO tougheners and cured with ECA100NC (b) and MHHPA (c).
Figure 4:
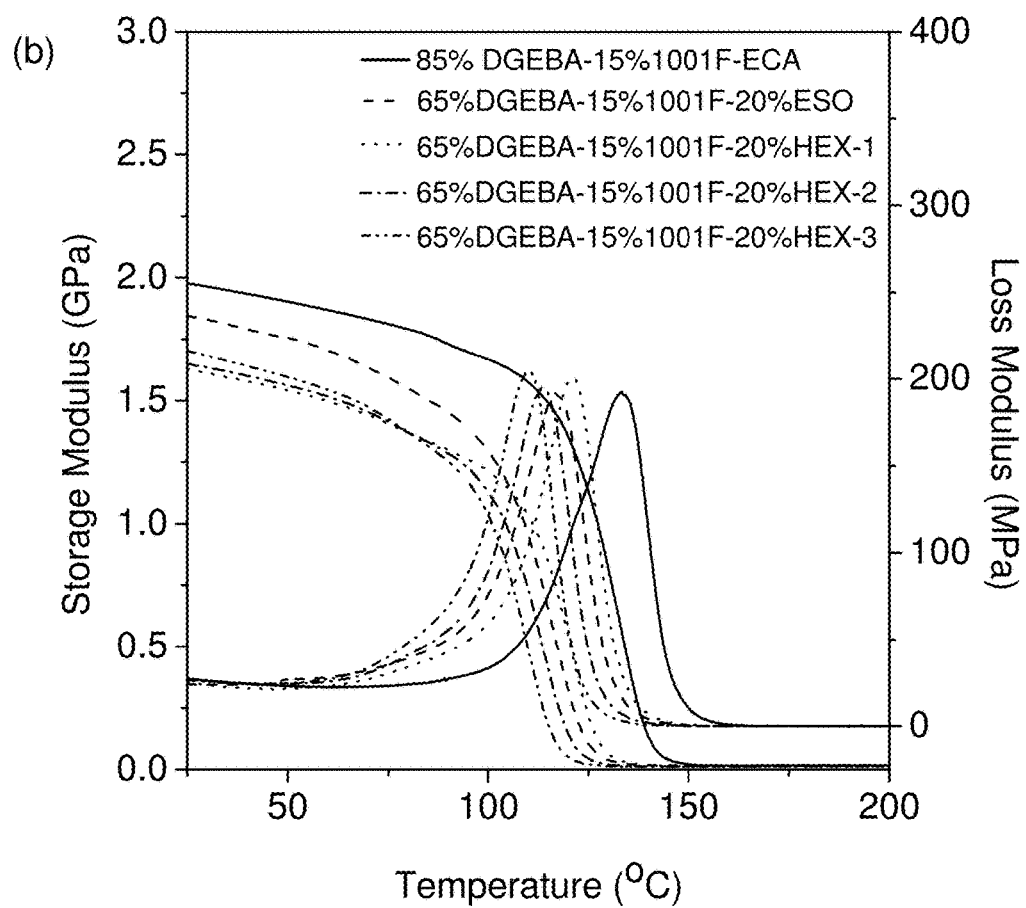
Figure 4:
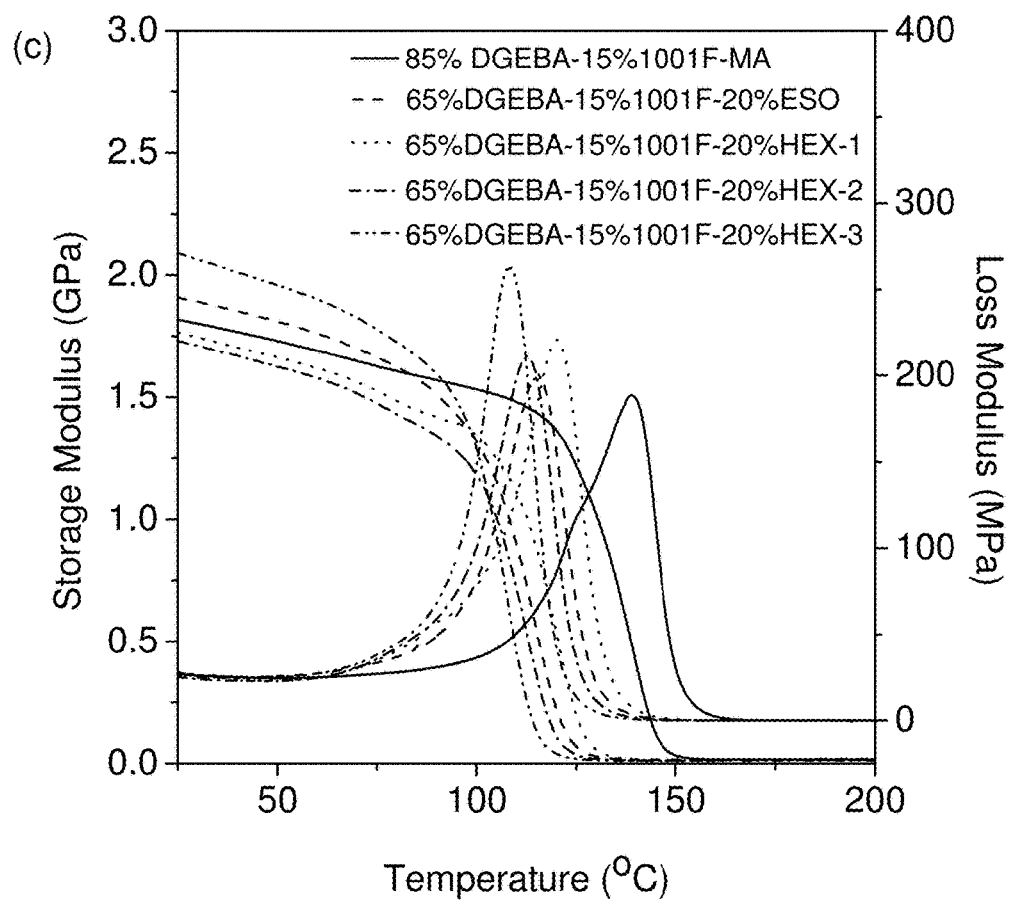

The properties of the above epoxy thermosets cured with ECA 100NC were compared to epoxy thermosets that were cured with methyl hexahydrophthalic anhydride (MHHPA). The thermosets cured with MHHPA were prepared by reacting 20 weight parts of grafted ESO with 80 weight parts of DGEBA. The results are shown in FIG. 4, and summarized in Table 4 below. An analysis of the data shows similar trends as for the epoxy thermosets cured with ECA 100NC. The epoxy thermoset prepared from neat DGEBA that was cured with MHHPA showed a glass transition temperature at 147° C., whereas epoxy thermosets comprising 20 parts by weight HEX-1, HEX-2 and HEX-3 showed lower glass transition temperatures of 128° C., 125° C. and 119° C., respectively.

Further, the epoxy blend system with 15 parts by weight of EPON 1001F and 85 parts by weight of DGEBA was prepared to verify the effect of the toughener on a higher molecular weight epoxy system. The toughener (20 parts by weight of ESO, HEX-1, HEX-2 and HEX-3) was incorporated into a high molecular weight epoxy system comprising 85 parts by weight DGEBA and 15 parts by weight EPON 1001F, and cured with either ECA 100NC or MHHPA. See FIG. 4 and Table 4. These samples also followed the same trend: the glass transition temperature of the high molecular weight epoxy system containing 85 parts by weight DGEBA and 15 parts by weight EPON 1001F cured with MHHPA or ECA 100NC was 147.4° C. and 147.4° C. respectively. This is similar to the decrease in the glass transition temperature due to the increase in the number of fatty acid residues on the grafted ESO. Further, epoxy thermoset comprising 20 parts by weight of toughener and 80 parts by weight of DGEBA/EPON 100F blend was investigated.

TABLE 4

Storage modulus at room temperature and glass transition temperature of neat epoxy thermosets and epoxy thermosets prepared with grafted ESO.

| Sample Code* | Storage Modulus (GPa) | Modulus $T_g$ (Loss) | $T_g$ (Tan Delta) |
|---|---|---|---|
| 100% DGEBA-MA | 2.12 | 138° C. | 147° C. |
| 20% ESO-MA | 1.99 | 115° C. | 126° C. |
| 20% HEX-1-MA | 1.81 | 117° C. | 128° C. |
| 20% HEX-2-MA | 1.74 | 115° C. | 125° C. |
| 20% HEX-3-MA | 2.11 | 109° C. | 119° C. |
| 15% 1001F-MA | 1.97 | 139° C. | 147° C. |
| 20% ESO-15% 1001F-MA | 1.84 | 116° C. | 126° C. |
| 20% HEX-1-15% 1001F-MA | 1.62 | 120° C. | 130° C. |
| 20% HEX-2-15% 1001F-MA | 1.64 | 113° C. | 127° C. |
| 20% HEX-3-15% 1001F-MA | 1.69 | 108° C. | 118° C. |
| 15% 1001F-ECA | 1.81 | 134° C. | 142° C. |
| 20% ESO-15% 1001F-EC | 1.91 | 117° C. | 127° C. |
| 20% HEX-1-15% 1001F-EC | 1.76 | 114° C. | 130° C. |
| 20% HEX-2-15% 1001F-EC | 1.72 | 113° C. | 124° C. |
| 20% HEX-3-15% 1001F-EC | 2.08 | 110° C. | 120° C. |

For the epoxy thermosets prepared by reacting the epoxide resin with ESO modified with methylhexahydrophthalic anhydride, microscopic phase separation was observed. The Dynamic Mechanical Analysis values are presented in Table 5 below. The glass transition temperature of these epoxy thermosets was higher than the glass transition temperature of epoxy thermosets comprising hexanoic anhydride modified ESO.

TABLE 5

Storage modulus at room temperature and $T_g$ of neat and toughened thermosetting polymers with modified ESO tougheners.

| Sample Code* | Storage Modulus (GPa) | Modulus $T_g$ (Loss) | $T_g$ (Tan Delta) |
|---|---|---|---|
| 10% MHPA-1-90% DGEBA-MA | 1.78 | 141° C. | 150° C. |
| 10% MHPA-2-90% DGEBA-MA | 1.71 | 140° C. | 149° C. |
| 10% MHPA-3-90% DGEBA-MA | 1.69 | 141° C. | 151° C. |
| 15% MHPA-1-85% DGEBA-MA | 1.58 | 139° C. | 147° C. |
| 15% MHPA-2-85% DGEBA-MA | 1.80 | 137° C. | 146° C. |
| 15% MHPA-3-85% DGEBA-MA | 1.81 | 135° C. | 143° C. |
| 20% MHPA-1-80% DGEBA-MA | 1.66 | 133° C. | 142° C. |
| 20% MHPA-2-80% DGEBA-MA | 1.59 | 135° C. | 145° C. |
| 20% MHPA-3-80% DGEBA-MA | 1.78 | 133° C. | 143° C. |

Example 7—Fracture Properties

Figure 5:
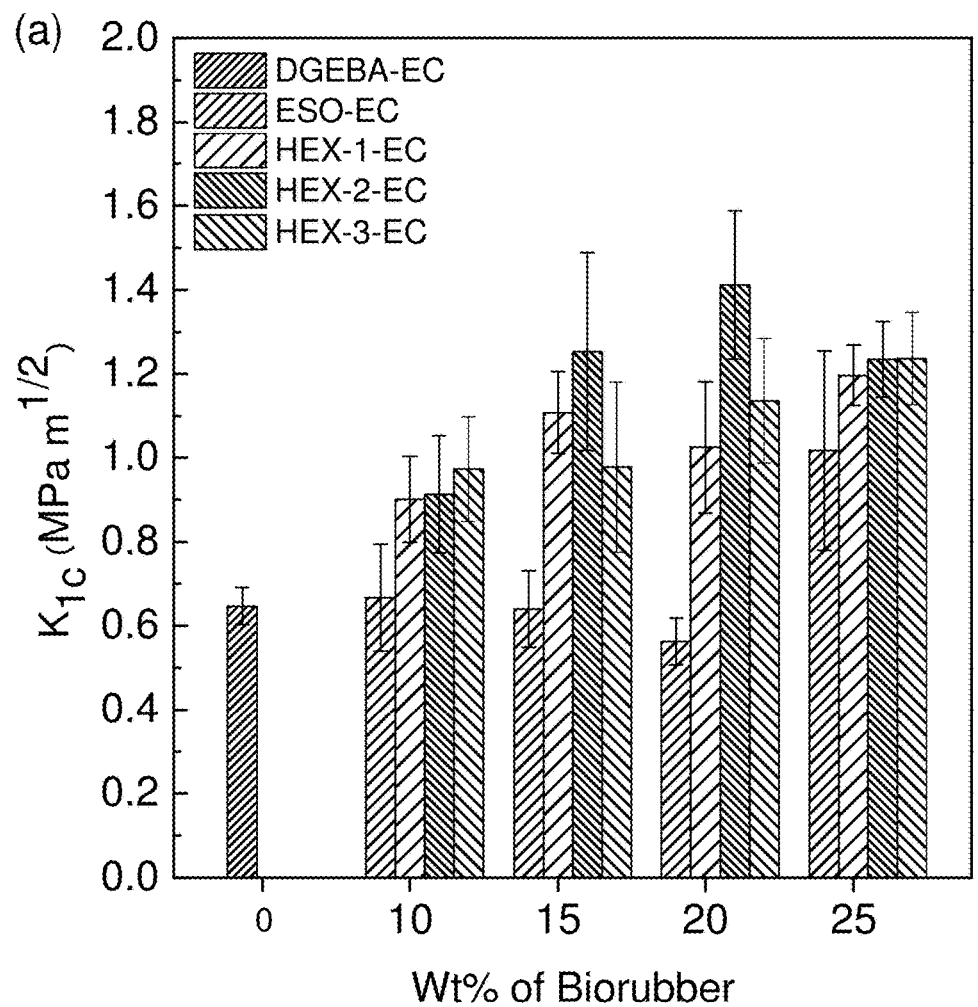
FIG. 5 shows the critical strain energy release rate ($G_{1c}$) and critical stress intensity factor ($K_{1c}$) of neat and toughened thermosetting polymers cured with ECA100NC with various weight percentages of ESO and modified ESO.
Figure 5:
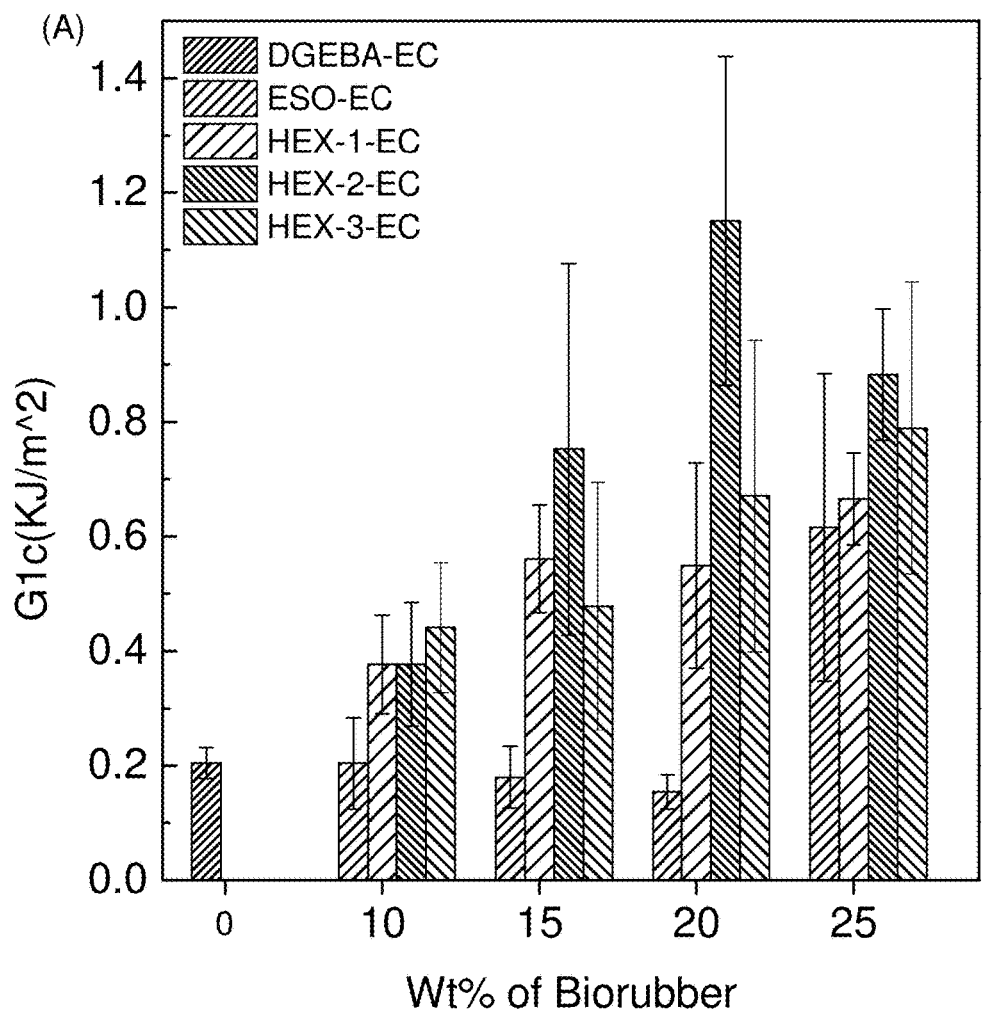

Fracture toughness tests were carried out to measure the toughening effects of the grafted ESO in a DGEBA anhydride cured system. FIG. 5 and Table 6 show the fracture toughness of the DGEBA epoxy thermosets comprising various amounts of ESO and grafted ESO. The critical stress intensity factor ($K_{1c}$) and the critical strain energy release rate ($G_{1c}$) were distinctly ameliorated by increasing the weight parts of grafted ESO. The values of fracture toughness ($K_{1c}$) and fracture energy ($G_{1c}$) appear to be a function of the weight parts of the grafted ESO. In general, the values of $K_{1c}$ and $G_{1c}$ for most of the samples with grafted ESO are higher than the neat epoxy resin. The incorporation of grafted ESO imparts an increase in the values of $K_{1c}$ and $G_{1c}$ up to an optimum content of 20 parts by weight. However, no further increase in the values of $K_{1c}$ and $G_{1c}$ up were observed. Among all samples tested, the sample with 20 parts by weight of HEX-2 exhibits the best toughening effect with a 218% increase in $K_{1c}$ and 564% increase in $G_{1c}$ with respect to neat DGEBA cured with ECA 100NC. However, the benefits of this improvement are tempered by a 20° C. reduction of the glass transition temperature.

TABLE 6

$K_{1c}$ and $G_{1c}$ of neat and toughened thermosetting polymers with grafted ESO tougheners cured with ECA 100NC.

| Sample Code* | $K_{1c}$ (MPa m$^{1/2}$) | $G_{1c}$ (KJ/m$^2$) |
|---|---|---|
| 100% DGEBA-EC | 0.647 ± 0.044 | 0.204 ± 0.027 |
| 10% ESO-90% DGEBA-EC | 0.667 ± 0.127 | 0.204 ± 0.080 |
| 10% HEX-1-90% DGEBA-EC | 0.901 ± 0.102 | 0.377 ± 0.086 |
| 10% HEX-2-90% DGEBA-EC | 0.913 ± 0.139 | 0.377 ± 0.108 |
| 10% HEX-3-90% DGEBA-EC | 0.973 ± 0.125 | 0.441 ± 0.113 |
| 15% ESO-85% DGEBA-EC | 0.640 ± 0.091 | 0.179 ± 0.054 |
| 15% HEX-1-85% DGEBA-EC | 1.108 ± 0.098 | 0.561 ± 0.094 |
| 15% HEX-2-85% DGEBA-EC | 1.263 ± 0.236 | 0.752 ± 0.324 |
| 15% HEX-3-85% DGEBA-EC | 0.978 ± 0.203 | 0.478 ± 0.215 |
| 20% ESO-80% DGEBA-EC | 0.563 ± 0.056 | 0.154 ± 0.030 |
| 20% HEX-1-80% DGEBA-EC | 1.026 ± 0.157 | 0.549 ± 0.179 |
| 20% HEX-2-80% DGEBA-EC | 1.412 ± 0.176 | 1.151 ± 0.287 |

TABLE 6-continued $K_{1c}$, and $G_{1c}$ of neat and toughened thermosetting polymers with grafted ESO tougheners cured with ECA 100NC.

| Sample Code* | $K_{1c}$ (MPa m$^{1/2}$) | $G_{1c}$ (KJ/m$^2$) |
|---|---|---|
| 20% HEX-3-80% DGEBA-EC | 1.136 ± 0.149 | 0.671 ± 0.272 |
| 25% ESO-75% DGEBA-EC | 1.017 ± 0.238 | 0.616 ± 0.268 |
| 25% HEX-1-75% DGEBA-EC | 1.197 ± 0.072 | 0.665 ± 0.081 |
| 25% HEX-2-75% DGEBA-EC | 1.235 ± 0.090 | 0.783 ± 0.114 |
| 25% HEX-3-75% DGEBA-EC | 1.237 ± 0.110 | 0.789 ± 0.255 |

Figure 6:
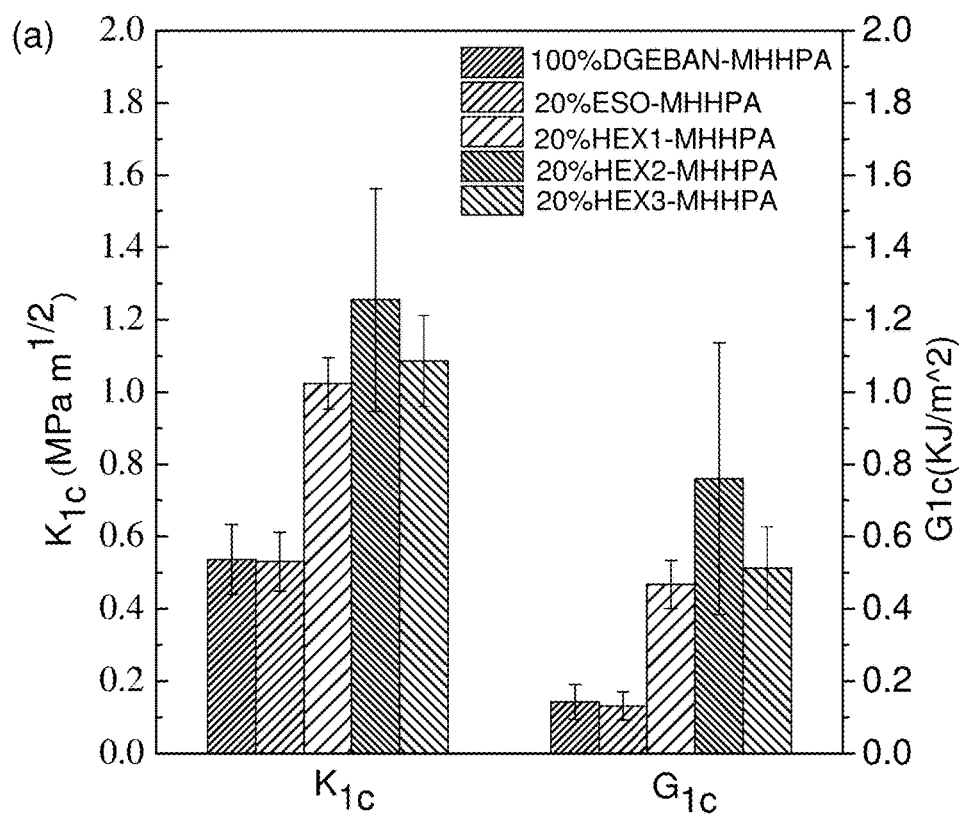
FIG. 6 shows the $K_{1c}$ and $G_{1c}$ of neat and toughened thermosetting polymers: (a) cured with MHHPA, and (b & c) added 15% EPON 1001F and cured with ECA100NC and MHHPA.
Figure 6:
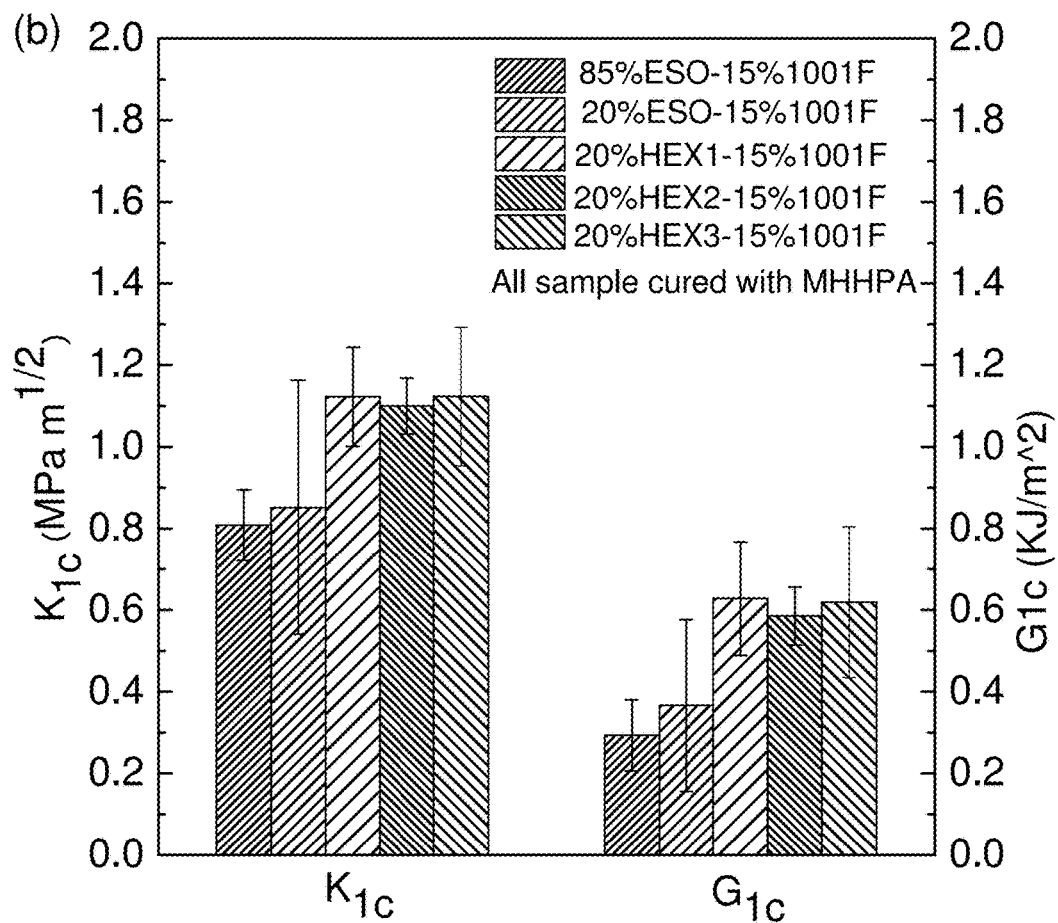
Figure 6:
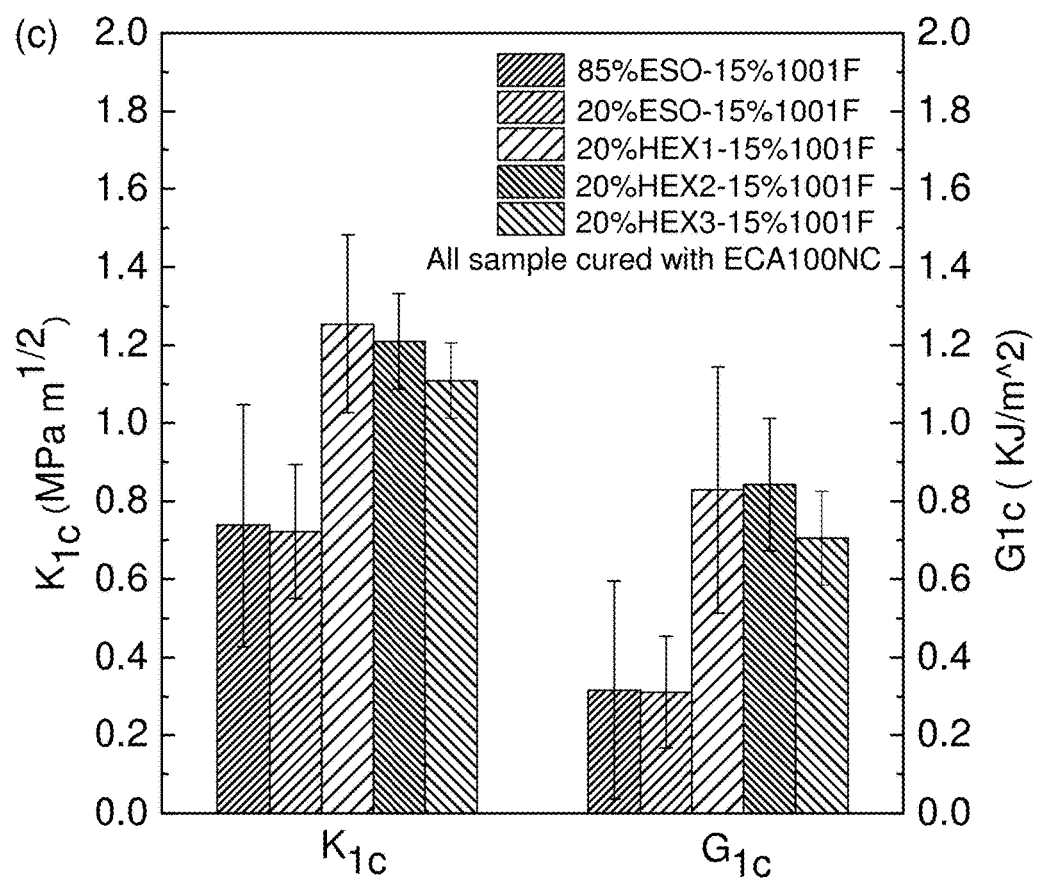

A DGEBA epoxy thermoset with 20 parts by weight of HEX was prepared to evaluate the effect of an MHHPA curing agent. The toughness property of HEX-2 samples were improved as shown by the $K_{1c}$ (1.255±0.308 MPa m$^{1/2}$) and $G_{1c}$ (0.760±0.376 KJ/m$^2$) values, which are significantly higher than the MHHPA cured thermoset obtained from neat DGEBA and 20% ungrafted ESO. See FIG. 6 and Table 7. The shear localization was enhanced due to the presence of particles of grafted ESO, which act as stress concentrators, resulting in the enhancement of critical stress intensity factor and the critical strain energy release rate.

Pearson and Yee et al. have reported that two main factors that regulate the toughening mechanism epoxy system are cavitation of rubber particles and generation of shear bands. R. A. Pearson, A. F. Lee, "Toughening mechanism in thermoplastic-modified epoxies: 1. Modification using poly (phenylene oxide)," Polymer, vol. 34, iss. 17, pp 3658-3670, 1993; and R. A. Pearson, A. F. Lee, "Toughening mechanism in thermoplastic-modified epoxies: Part 3 The effect of cross-linking density," J. Mater. Sci., vol. 24, pp 2571-2580, 1989. The efficiency of these mechanisms depends on rubber particle sizes. Furthermore, to verify the effect of the toughener on higher molecular weight epoxies, an epoxy blend system was prepared with 15 parts by weight of EPON 1001F and 85 parts by weight DGEBA. The toughener (20 wt. % of ESO, HEX-1, HEX-2 or HEX-3) was incorporated into the prepared high molecular epoxy system of DGEBA/ 1001F and cured with ECA 100NC or MHHPA. The fracture toughness was determined to evaluate the $K_{1c}$ and $G_{1c}$. See FIG. 6 and Table 7. It was found that the EPON1001F blend system had a higher molecular weight compared to pure DGEBA, but the $K_{1c}$ value for the system comprising 20 parts by weight HEX-2, 15 parts by weight EPON 1001F, and 65 parts by weight DGEBA (1.210±0.122 MPa m$^{1/2}$) was lower than the $K_{1c}$ value for the system comprising 20 parts by weight HEX-2, and 80 parts by weight DGEBA (1.412±0.176 MPa m$^{1/2}$). This may due to the presence of higher hydroxyl groups in the EPON 1001F system, which may react with remaining epoxy groups on the grafted ESO and become a part of the network chain, which would reduce the toughening effect.

TABLE 7

$K_{1c}$ and $G_{1c}$ of neat and toughened thermosetting polymers with grafted ESO tougheners cured with MHHPA

| Sample Code* | $K_{1c}$ (MPa m$^{1/2}$) | $G_{1c}$ (KJ/m$^2$) |
|---|---|---|
| 100% DGEBA-MA | 0.536 ± 0.096 | 0.143 ± 0.048 |
| 20% ESO-MA | 0.530 ± 0.081 | 0.132 ± 0.039 |
| 20% HEX-1-MA | 1.024 ± 0.071 | 0.467 ± 0.066 |
| 20% HEX-2-MA | 1.255 ± 0.308 | 0.760 ± 0.376 |
| 20% HEX-3-MA | 1.086 ± 0.126 | 0.512 ± 0.114 |
| 15% 1001F-MA | 0.808 ± 0.087 | 0.293 ± 0.087 |
| 20% ESO-15% 1001F-MA | 0.852 ± 0.311 | 0.366 ± 0.210 |
| 20% HEX-1-15% 1001F-MA | 1.122 ± 0.121 | 0.628 ± 0.139 |
| 20% HEX-2-15% 1001F-MA | 1.100 ± 0.068 | 0.585 ± 0.071 |
| 20% HEX-3-15% 1001F-MA | 1.123 ± 0.169 | 0.619 ± 0.185 |
| 15% 1001F-ECA | 0.738 ± 0.310 | 0.316 ± 0.280 |
| 20% ESO-15% 1001F-EC | 0.722 ± 0.171 | 0.311 ± 0.144 |
| 20% HEX-1-15% 1001F-EC | 1.254 ± 0.228 | 0.829 ± 0.316 |
| 20% HEX-2-15% 1001F-EC | 1.210 ± 0.122 | 0.842 ± 0.169 |
| 20% HEX-3-15% 1001F-EC | 1.109 ± 0.097 | 0.705 ± 0.120 |

Example 8—Fracture Surface Analysis

Figure 7:
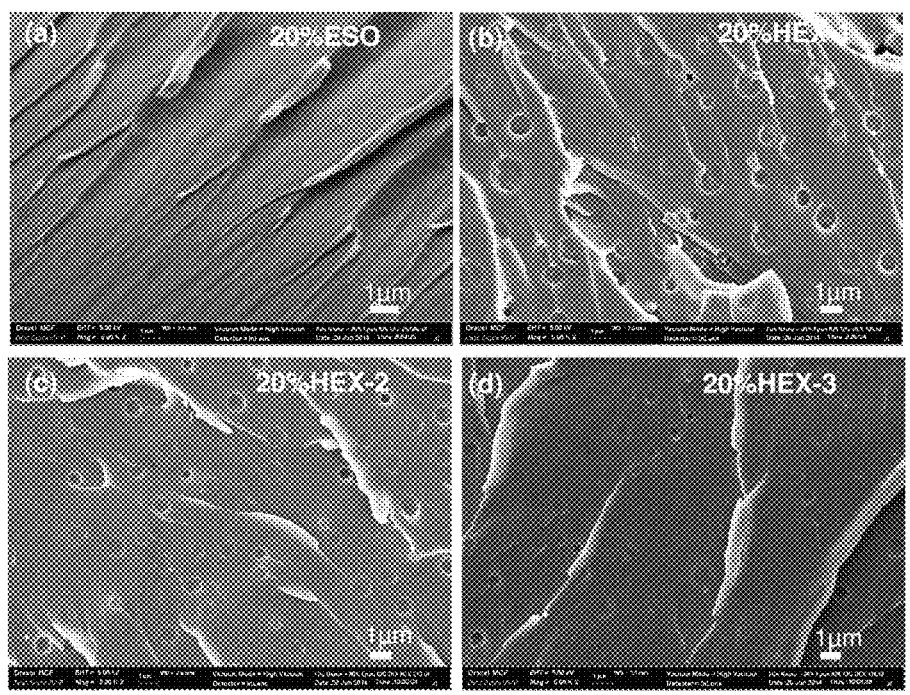
FIG. 7 shows SEM image of neat and toughened thermosetting polymers cured with ECA100NC with 20 wt % of ESO and modified ESO.
Figure 8:
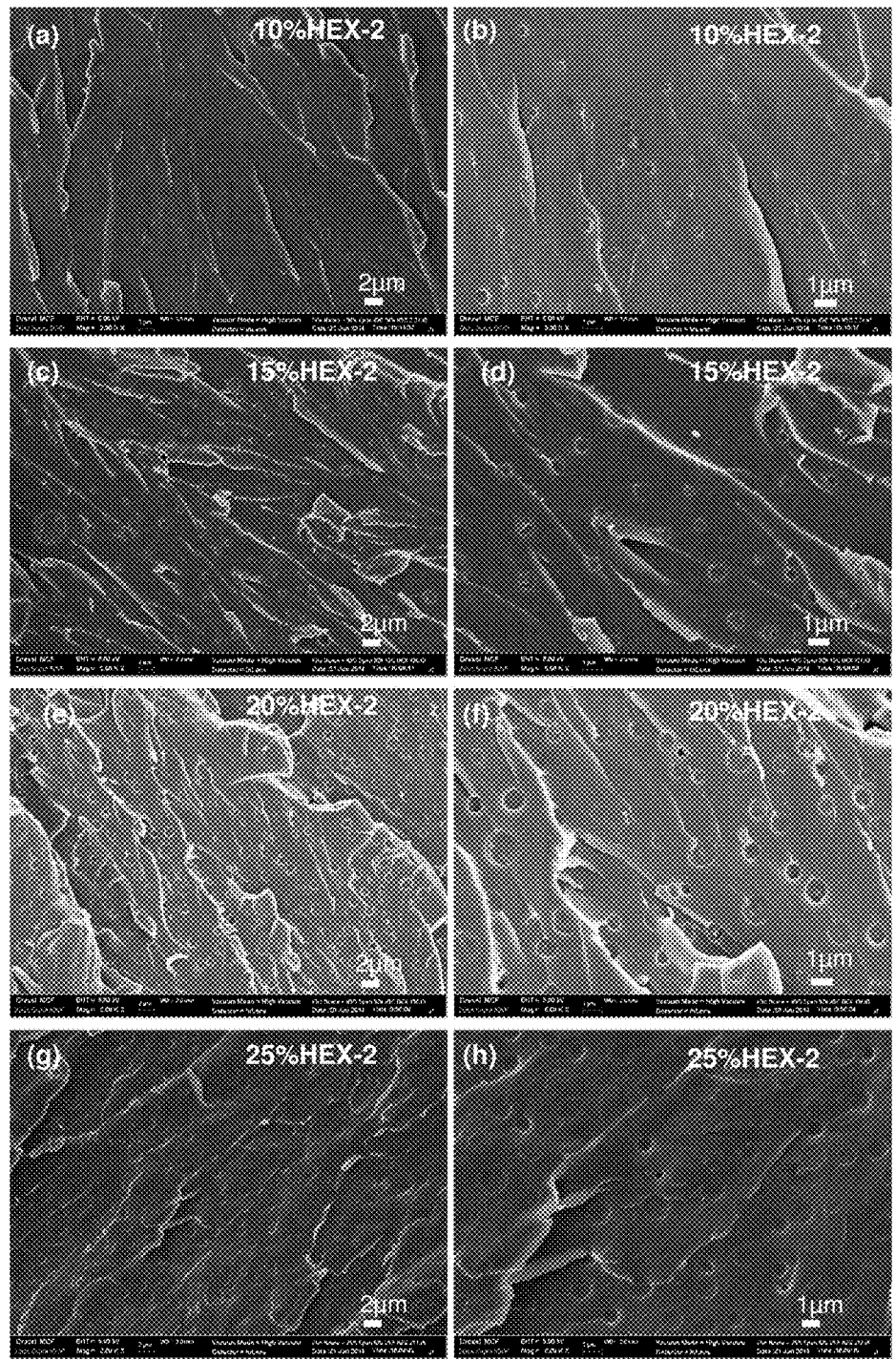
FIG. 8 shows SEM images of neat and toughened thermosetting polymers cured with ECA100NC with various weight percentages of modified ESO.

The fracture morphology of the toughened epoxy system was investigated by SEM. The SEM image was used to help to understand the effects of the use of the grafted ESO on the epoxy network. In case of 20 parts by weight ESO, the brittleness of the sample can be observed from the presence of the smooth glassy fracture surface with cracks in a different plane and which displayed weak resistance to crack propagation. See FIGS. 7 and 8.

The data suggests that the ESO was fully reacted into the epoxy system and became a part of the network. The samples were clear and transparent and macroscopic phase separation was not observed even at loadings of up to 20 parts by weight of neat ESO. However, opaque and cloudy samples were observed even at loadings of 10 parts by weight of grafted ESO.

The grafted ESO/DGEBA epoxy thermoset systems have obvious advantages for preparation of two-phase thermosets over the pure ESO/DGEBA epoxy resin system. The SEM images of grafted ESO toughened epoxies (20% HEX-1, HEX-2 and HEX-3) showed microstructures of evenly distributed particles of sub-micron size. These dispersed particles played a key role as centers of dissipation of mechanical energy through shear yielding and provided the highest values for impact strength.

The neat ESO/DGEBA epoxy thermoset systems had a lower impact strength because such systems did not exhibit phase separation. All other compositions of grafted ESO/ DGEBA epoxy thermoset systems exhibited better performance than the neat DGEBA epoxy thermoset system. The anhydride curing molecules at the interface are expected to react with both the epoxy groups of the DGEBA resin and the unreacted epoxy groups of the grafted ESO, and are expected to form chemical bonds between the rigid matrix and the rubbery domains, which may also play a role in the toughening of grafted ESO-based epoxy systems.

Example 9—Fracture Toughness

The epoxidized soybean oil (ESO) used in this example was supplied by Galata Chemicals from Louisiana under the trade name of Drapex® 6.8. This material was used without any further purification. Boron trifluoride diethyl etherate, dimethyl benzyl amine, sodium chloride, and sodium bicarbonate were obtained from Fisher Scientific and used as received. Diglycidyl ether of bisphenol A (DGEBA, EPON 828, Miller Stephenson, EEW 188 g/eq), and methyl hexahydrophthalic anhydride (MHHPA) curing agent were obtained from Dixie Chemical, Pasadena Tex.

The ESO was first modified with MHHPA in a 4:1 molar ration of epoxy groups in the ESO to moles of MHHPA (hereinafter referred to as "MHHPA-1"). 12.5 g of ESO (50 mmol of epoxy groups) and 2.1 g of MHHPA (12.5 mmol) in 100 mL of methylene chloride was added to a dry three-neck 250 mL round-bottom flask fitted with a condenser. Boron trifluoride etherate (0.125 g, 0.95 mmol) was then added and the mixture was refluxed for 3 hours under a dry nitrogen atmosphere. The molar ratio of moles of epoxy group in the ESO to the moles MHHPA was also varied to 4:2 (hereinafter referred to as "MHHPA-2") and to 4:3 (hereinafter referred to as "MHHPA-3"). The reaction mixture was then cooled to the room temperature and the reaction product was purified by washing three times each with 100 mL of 5% NaHCO$_3$ solution followed by washing with 100 mL of brine solution. The methylene chloride layer was dried with anhydrous magnesium sulfate overnight. The solvent was removed with rotary evaporation. Modified ESO was obtained.

The DGEBA was blended with the three different modified ESO's (MHHPA-1, MHHPA-2 and MHHPA-3) at three different weight ratios, namely, 10, 15, and 20%, as shown in Table 8. Particularly, DGEBA and the various modified ESO's were mixed using a THINKY planetary mixer at 1800 rpm for 4 minutes, with a subsequent degassing step conducted 1800 rpm for 2 minutes. Further, a stoichiometric amount (0.9 mol) of anhydride hardener, based on the MHHPA and 2% of catalyst (dimethyl benzyl amine) were subsequently added and mixed with the DGEBA and ESO under similar mixing conditions. Each mixture was then degassed for 5 minutes in a vacuum, poured into a rubber mold, cured at 90° C. for 9 hours and post-cured at 200° C. for 9 additional hours. Fracture toughness was measured following the procedure of ASTM# D5045-99 (2007) using a Single Edge Notched Bend methodology on 2"×0.5"× 0.25" samples. The critical stress intensity factor ($K_{1c}$) and the critical strain energy release rate (GO of the cured resins were generally enhanced by increasing the weight percentages of modified ESO (Table 8) in the compositions.

Figure 9:
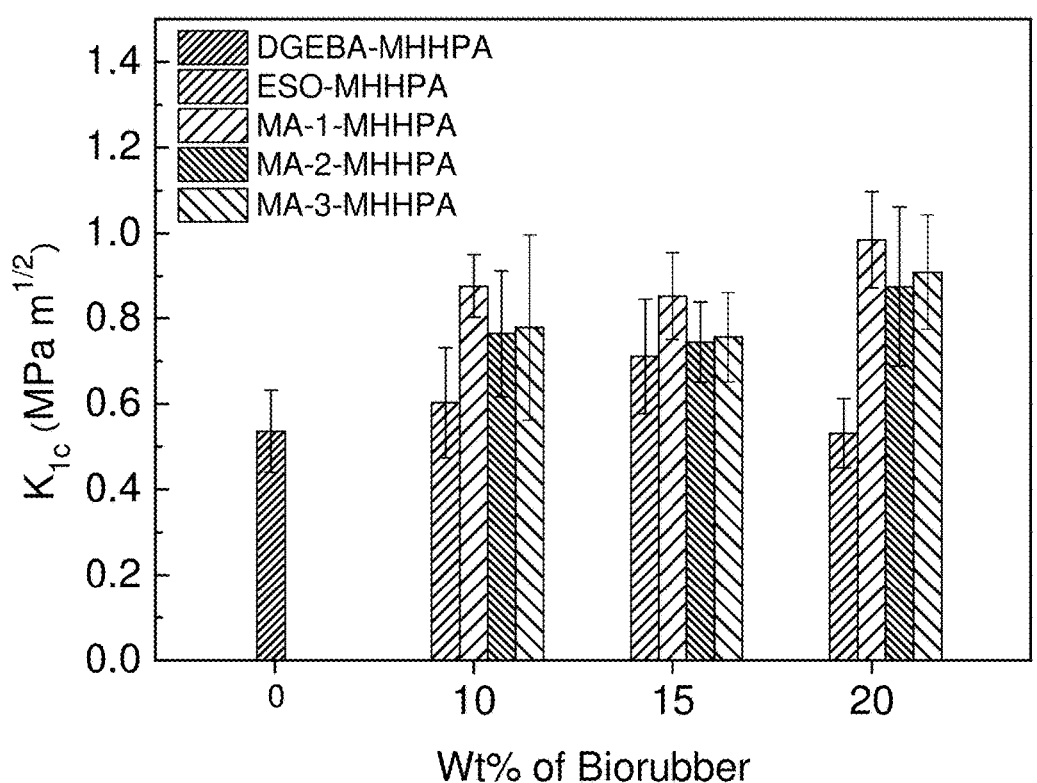
FIG. 9 shows a plot of $K_{1c}$ versus weight percent of biorubber for neat or toughened thermosetting polymers grafted with ESO and cured with MHHPA, as described in Example 9.
Figure 10:
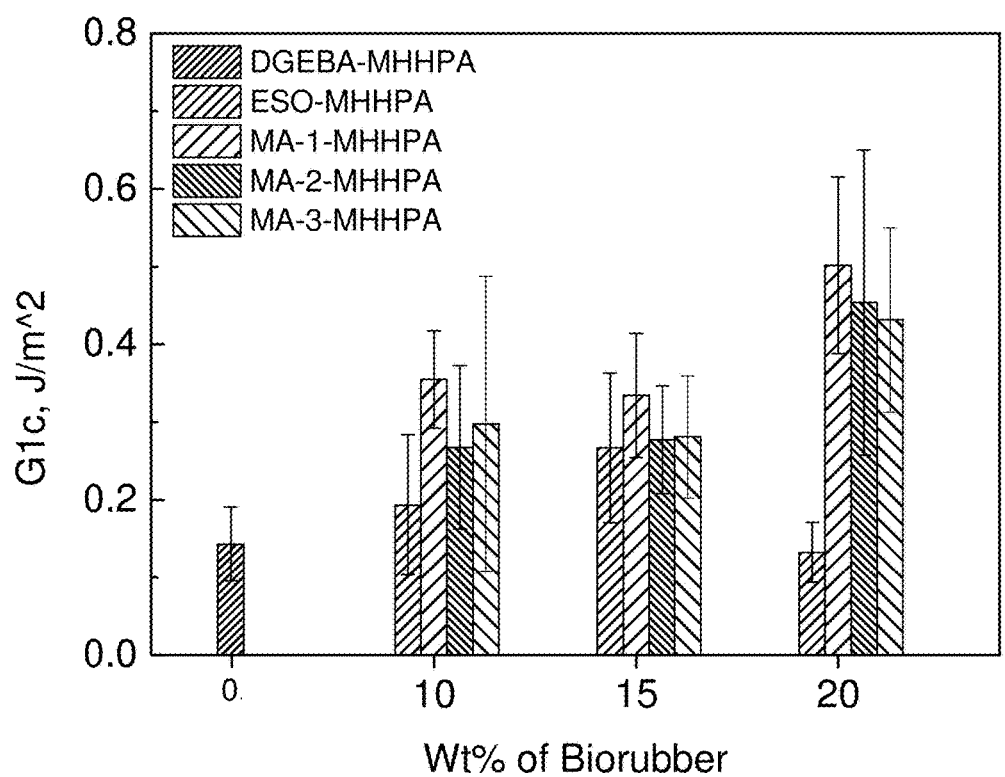
FIG. 10 shows a plot of $G_{1c}$ versus weight percent of biorubber for neat or toughened thermosetting polymers grafted with ESO and cured with MHHPA, as described in Example 9.

The values of $K_{1c}$ and $G_{1c}$ were correlated with the weight percentages of biorubber in the compositions (FIGS. 9-10). The values of $K_{1c}$ and $G_{1c}$ for the cured resins with modified ESO were observed to be higher than for the neat epoxy resin. The incorporation of modified ESO increased the value of $K_{1c}$ and $G_{1c}$ up to an optimum content of biorubber at about 20 wt. %. The cured resins with 20 wt. % of MHHPA-1 showed the highest toughening effect. However, this improvement could also be achieved by 5° C. reduction in the $T_g$ value, which provided a $K_{1c}$ of 0.985±0.112 MPa m$^{1/2}$ and a $G_{1c}$ of 0.502±0.114 KJ/m$^2$, much higher than the MHHPA-1 cured neat DGEBA and the MHHPA-1 cured DGEBA containing 20% unmodified ESO.

TABLE 8

$K_{1c}$ and $G_{1c}$ of neat and toughened thermosetting polymers.

| Sample Code | $K_{1c}$ (MPa m$^{1/2}$) | $G_{1c}$ (KJ/m$^2$) |
|---|---|---|
| 10% MHHPA-1 and 90% DGEBA | 0.876 ± 0.074 | 0.355 ± 0.062 |
| 10% MHHPA-2 and 90% DGEBA | 0.765 ± 0.148 | 0.267 ± 0.105 |
| 10% MHHPA-3 and 90% DGEBA | 0.779 ± 0.217 | 0.298 ± 0.190 |
| 15% MHHPA-1 and 85% DGEBA | 0.853 ± 0.102 | 0.334 ± 0.080 |
| 15% MHHPA-2 and 85% DGEBA | 0.744 ± 0.094 | 0.277 ± 0.069 |
| 15% MHHPA-3 and 85% DGEBA | 0.757 ± 0.105 | 0.281 ± 0.089 |
| 20% MHHPA-1 and 80% DGEBA | 0.985 ± 0.112 | 0.502 ± 0.114 |
| 20% MHHPA-2 and 80% DGEBA | 0.875 ± 0.186 | 0.454 ± 0.196 |
| 20% MHHPA-3 and 80% DGEBA | 0.909 ± 0.134 | 0.432 ± 0.119 |

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meanings of the terms in which the appended claims are expressed.

What is claimed is:

1. An epoxy thermoset prepared by reaction of:
   (a) a grafted triglyceride prepared by grafting at least one acid anhydride moiety onto an epoxidized triglyceride, wherein the acid anhydride contains from about 4 to about 40 carbon atoms per molecule;
   (b) an epoxy resin; and
   (c) an anhydride curing agent, wherein the weight ratio of the grafted triglyceride to the epoxy resin is in the range of about 1:99 to about 99:1, and wherein phase separation of the grafted triglycerides from the epoxy resin occurs during curing.

2. The epoxy thermoset of claim 1, wherein a molar ratio of the acid anhydride to the epoxidized triglyceride is from about 0.1:1 to about 4:1.

3. The epoxy thermoset of claim 1, wherein a molar ratio of the acid anhydride to the epoxidized triglyceride is from about 1:1 to about 3.5:1.

4. The epoxy thermoset of claim 1, wherein a molar ratio of the acid anhydride to the epoxidized triglyceride is from about 2:1 to about 3:1.

5. The epoxy thermoset of claim 1, wherein the grafted triglyceride has a molecular weight of from about 990 g/mole to about 3280 g/mole.

6. The epoxy thermoset of claim 1, wherein the weight ratio of the grafted triglyceride to the epoxy resin is in a range of about 1:99 to about 30:70.

7. The epoxy thermoset of claim 1, wherein the triglyceride is obtained from a material selected from a plant oil, an animal oil, an algae oil, and a mixture thereof.

8. The epoxy thermoset of claim 1, wherein the grafted triglyceride comprises one or more epoxy groups.

9. The epoxy thermoset of claim 1, wherein the epoxy resin is selected from bisphenol A epoxy resin, bisphenol F epoxy resin, novolac epoxy resin, aliphatic epoxy resin, and glycidylamine epoxy resin.

10. The epoxy thermoset of claim 1, wherein the epoxy resin is a bisphenol-A diglycidyl ether epoxy resin monomer or an oligomer thereof.

11. The epoxy thermoset of claim 1, wherein the acid anhydride is selected from the group consisting of R$_1$—C(O)—O—C(O)—R$_2$, wherein R$_1$ and R$_2$ is each independently selected from an alkane containing from about 1 to about 19 carbon atoms.

12. The epoxy thermoset of claim 1, wherein the anhydride curing agent is selected from methylhexahydrophthalic anhydride, hexahydrophthalic anhydride, methyltetrahydrophthalic anhydride, phthalic anhydride, trimellitic anhydride, pyromellitic anhydride, benzophenone-3,3',4,4'-tetracarboxylic dianhydride, glycerol tris (trimellitate anhydride), maleic anhydride, tetrahydrophthalic anhydride, 3,6-endomethylene-1,2,3,6-tetrahydrophthalic anhydride, methyl endomethylene tetrahydrophthalic anhydride, dodecenyl succinic anhydride, hexahydrophthalic anhydride, hexahydro-4-methylphthalic anhydride, succinic anhydride, methylcyclohexene dicarboxylic anhydride, chlorendic anhydride, and mixtures thereof.

13. The epoxy thermoset of claim 1, wherein the acid anhydride is selected from methylhexahydrophthalic anhydride, hexahydrophthalic anhydride, methyltetrahydrophthalic anhydride, phthalic anhydride, trimellitic anhydride, pyromellitic anhydride, benzophenone-3,3',4,4'-tetracarboxylic dianhydride, glycerol tris(trimellitate anhydride), maleic anhydride, tetrahydrophthalic anhydride, 3,6-endomethylene-1,2,3,6-tetrahydrophthalic anhydride, methyl endomethylene tetrahydrophthalic anhydride, dodecenyl succinic anhydride, hexahydrophthalic anhydride, hexahydro-4-methylphthalic anhydride, succinic anhydride, methylcyclohexene dicarboxylic anhydride, chlorendic anhydride, and mixtures thereof.

14. The epoxy thermoset of claim 1, wherein the acid anhydride contains 12 to 32 carbon atoms per molecule.

15. A composite comprising the epoxy thermoset of claim 1.

16. The composite as claimed in claim 15, comprising a filler and/or a reinforcing material.

17. The composite as claimed in claim 15, comprising one or more materials selected from fibers, clays, silicates, fillers and whiskers.

18. A composite as claimed in claim 15, comprising one or more additives selected from colorants, pigments, carbon black, impact modifiers, antioxidants, stabilizers, flame retardants, reheating aids, crystallization aids, oxygen scavengers, plasticizers, flexibilizers, nucleating agents, foaming agents, and mold release agents.

19. An epoxy thermoset prepared by reaction of: a grafted triglyceride prepared by grafting at least one acid anhydride moiety onto an epoxidized triglyceride, wherein the acid anhydride contains from about 4 to about 40 carbon atoms per molecule; an epoxy resin, and an anhydride curing agent, and wherein phase separation of the grafted triglycerides from the epoxy resin occurs during curing.

20. The epoxy thermoset of claim 1, which is a two-phase thermoset having particles comprising grafted triglyceride dispersed in the epoxy thermoset.

21. The epoxy thermoset of claim 19, which is a two-phase thermoset having particles comprising grafted triglyceride dispersed in the epoxy thermoset.

* * * * *